US012180773B2

(12) United States Patent
Xue et al.

(10) Patent No.: US 12,180,773 B2
(45) **Date of Patent: *Dec. 31, 2024**

(54) DAMPING HINGE

(71) Applicant: Fuzhou Autran Industrial Co., Ltd., Fujian (CN)

(72) Inventors: Liang Xue, Fujian (CN); Fan Chen, Fujian (CN)

(73) Assignee: FUZHOU AUTRAN INDUSTRIAL CO., LTD., Minhou Fuzhou (CN)

( * ) Notice: Subject to any disclaimer, the term of this patent is extended or adjusted under 35 U.S.C. 154(b) by 85 days.

This patent is subject to a terminal disclaimer.

(21) Appl. No.: 17/653,284

(22) Filed: Mar. 2, 2022

(65) Prior Publication Data

US 2022/0186539 A1 Jun. 16, 2022

Related U.S. Application Data

(63) Continuation-in-part of application No. 17/535,683, filed on Nov. 25, 2021, now Pat. No. 11,795,749, (Continued)

(30) Foreign Application Priority Data

Jul. 29, 2019 (CN) ........................ 201910687791.2
Mar. 2, 2021 (AU) ................................ 2021201367
Jan. 14, 2022 (AU) ................................ 2022200252

(51) Int. Cl.
*E05D 5/02* (2006.01)
*E05D 3/02* (2006.01)
(Continued)

(52) U.S. Cl.
CPC .................. *E05F 3/20* (2013.01); *E05D 3/02* (2013.01); *E05D 5/04* (2013.01); *E05F 3/04* (2013.01);
(Continued)

(58) Field of Classification Search
CPC ....... E05D 3/02; E05D 5/0246; E05D 5/0253; E05D 5/0261; E05D 5/0269; E05D 11/00;
(Continued)

(56) References Cited

U.S. PATENT DOCUMENTS 6,415,477 B1 * 7/2002 Hosaka ................. E05F 1/1261 16/284
7,552,509 B2 * 6/2009 Chen ........................ E05F 5/006 16/50
(Continued)

FOREIGN PATENT DOCUMENTS

CN 201605936 U 10/2010
CN 203296552 U 11/2013
(Continued)

OTHER PUBLICATIONS

ISA China National Intellectual Property Administration, International Search Report Issued in Application No. PCT/CN2020/092044, Aug. 17, 2020, WIPO, 3 pages.
(Continued)

*Primary Examiner* — Chuck Y Mah
(74) *Attorney, Agent, or Firm* — McCoy Russell LLP

(57) ABSTRACT

Provided is a damping hinge for controlled closing of a door or gate. The damping hinge includes a first clamp plate configured to be mounted to a fixed supporting panel; a second clamp plate configured to be mounted to a panel of the door or gate, wherein the second clamp plate is connected with the first clamp plate for relative rotation about a hinge axis; and a damping mechanism arranged on at least one of the first clamp plate and the second clamp plate including a damper arranged substantially parallel to the hinge axis and configured to impact relative rotation of the second clamp plate towards the first clamp plate during closing of the hinge. The damping mechanism may be arranged such that the damping mechanism may be located
(Continued)

outside of a plane of the respective panel and adjacent or next to an outer or facing surface of that panel.

20 Claims, 18 Drawing Sheets

Related U.S. Application Data which is a continuation of application No. PCT/CN2020/092044, filed on May 25, 2020.

(51) Int. Cl.

| | |
|---|---|
| ***E05D 5/04*** | (2006.01) |
| ***E05F 3/04*** | (2006.01) |
| ***E05F 3/20*** | (2006.01) |
| ***E05F 5/06*** | (2006.01) |

(52) U.S. Cl.

CPC ........... *E05F 5/06* (2013.01); *E05Y 2900/132* (2013.01); *E05Y 2900/148* (2013.01)

(58) Field of Classification Search

CPC ...... E05D 2003/027; E05D 2005/0253; E05D 2005/0269; E05D 2005/0263; E05D 2005/0261; E05D 2201/21; E05D 2201/264; E05D 2201/41; E05D 2201/46; E05D 2201/492; E05D 7/081; E05D 7/08; E05D 5/04; E05Y 2900/132; E05Y 2900/148; E05Y 2900/114; E05Y 2600/502; E05Y 2600/60; E05F 1/1215; E05F 1/12; E05F 1/1207; E05F 3/04; E05F 3/20; E05F 3/18; E05F 11/385; E05F 5/06; E06B 3/54; A47K 3/362; A47K 2003/367; A47F 3/12; A47F 3/125

See application file for complete search history.

(56) References Cited

U.S. PATENT DOCUMENTS

| | | | | |
|---|---|---|---|---|
| 8,863,356 | B2 * | 10/2014 | Bacchetti | E05F 3/10 16/54 |
| 10,718,146 | B2 * | 7/2020 | Svara | F16F 9/19 |
| 10,934,757 | B2 * | 3/2021 | Svara | E05F 5/02 |
| 2005/0246863 | A1 | 11/2005 | Chesworth et al. | |
| 2009/0119875 | A1 * | 5/2009 | Migli | E05F 5/006 16/233 |
| 2016/0024829 | A1 * | 1/2016 | Lowe | E05F 5/08 16/85 |
| 2016/0060932 | A1 * | 3/2016 | Stuart | E05F 5/02 16/297 |
| 2016/0076292 | A1 * | 3/2016 | Stuart | E05D 11/082 16/297 |
| 2016/0153224 | A1 * | 6/2016 | Salice | E05D 3/16 16/65 |
| 2019/0048634 | A1 * | 2/2019 | Sevastopoulos | E05F 5/02 |
| 2019/0211602 | A1 * | 7/2019 | Stuart | E05F 3/20 |
| 2020/0300016 | A1 * | 9/2020 | Allen | E05F 5/10 |
| 2020/0318411 | A1 * | 10/2020 | Pecar | E05F 3/20 |

FOREIGN PATENT DOCUMENTS

| | | | | | |
|---|---|---|---|---|---|
| CN | 206487279 | U | | 9/2017 | |
| CN | 207988773 | U | | 10/2018 | |
| CN | 108756552 | A | * | 11/2018 | E05D 11/00 |
| CN | 208106167 | U | | 11/2018 | |
| CN | 110259302 | A | | 9/2019 | |
| CN | 210598563 | U | | 5/2020 | |
| GB | 2469846 | A | * | 11/2010 | E05F 5/006 |
| GB | 2469847 | A | * | 11/2010 | E05F 5/006 |
| KR | 20020006751 | A | | 1/2002 | |
| WO | WO-2021039254 | A1 | * | 3/2021 | E05D 11/1014 |

OTHER PUBLICATIONS

ISA China National Intellectual Property Administration, Written Opinion of the International Searching Authority Issued in Application No. PCT/CN2020/092044, Aug. 17, 2020, WIPO, 5 pages.

* cited by examiner

DAMPING HINGE

CROSS-REFERENCE TO RELATED APPLICATIONS

The present application is a continuation-in-part of U.S. Non-Provisional patent application Ser. No. 17/535,683, entitled "DAMPING HINGE", and filed on Nov. 25, 2021. U.S. Non-Provisional patent application Ser. No. 17/535,683 is a U.S. National Phase Continuation of International Application No. PCT/CN2020/092044, entitled "BUFFERING HINGE", and filed May 25, 2020. International Application No. PCT/CN2020/092044 claims priority to CN2019106877912 filed Jul. 29, 2019. The present application additionally claims priority to Australian Patent Application No. 2021201367, filed on Mar. 2, 2021, and to Australian Patent Application No. 2022200252 filed on Jan. 14, 2022. The entire contents of each of the above-listed applications are hereby incorporated by reference for all purposes.

TECHNICAL FIELD

The disclosure relates to the field of hinges, specifically to a kind of damping hinge. More particularly, the disclosure further relates to a damping hinge for controlled closing of a door or gate, especially a glass door or gate.

BACKGROUND

Hinges are devices or parts capable of connecting two portions of a machine, vehicle, door, window, or implement, wherein one or both portions connected through the hinge can rotate around the axis of the hinge. Hinges are generally applied to doors, windows, cupboards, and the like. As will be appreciated, in such applications on doors, windows, cupboards, and the like, the hinge is typically arranged such that the hinge axis extends vertically.

Traditional hinges for doors, gates and windows are back-flap hinges without dampers. Doors, gates, and windows without dampers may generate loud noises and violent vibrations if they slam shut, which affects user experience. In view of this, damping hinges are designed with dampers to make sure that doors, gates and windows can move slowly when closing and, with spring-biased self-closing hinges, will return slowly when released by hand due to control from the dampers. Damping hinges generate less noises and fewer vibrations compared with hinges without dampers.

Damping hinges often employ piston-type dampers, such as hydraulic dampers, with a pressure rod movable relative to a cylinder. Applying pressure to the pressure rod from an angle exceeding 3° offset from a longitudinal axis of the pressure rod can lead to damage of the damper piston during use. This is a problem in known damping hinges due to the fact that the dampers of existing hinges are typically arranged in use horizontally, and the surface that abuts or makes contact with the pressure rods rotates together with the relative rotation of the two clamp plates (i.e., two leaf assemblies) of the hinge. The pressure angle of the damper pressure rods will thus change in real time which, in turn, means that the pressure rods are regularly exposed to oblique forces (e.g., in excess of 3°) which then has a negative impact on the damping effect and on the service life of the damper.

SUMMARY

In view of the above, it would be desirable to provide a damping hinge that is able to exhibit improved damping effect and/or an improved service life of the damper and/or at least provide a useful alternative to known damping hinges.

According to one aspect, the present disclosure provides a damping hinge that includes a first clamp plate and a second clamp plate connected with one another for relative rotation about a vertical hinge axis, wherein one or more damping mechanisms is/are arranged in the first clamp plate and/or the second clamp plate. The damping mechanism includes a fixed pressure member or "block", a movable pressure member or "block" that is moveable in a vertical direction, and a damper that is arranged vertically and has two opposite ends connected to or engaging the fixed pressure member and the movable pressure member, respectively. A first surface of the movable pressure member is configured for abutting connection or engagement with a second surface on the other clamp plate to actuate movement of the movable pressure member in the vertical direction.

In this way, the first and second surfaces are configured to interact to move the movable pressure member in the vertical direction and the damper operates to retard or brake that movement, thereby providing a controlled closing action. In this regard, the first surface is an inclined surface and/or the second surface is an inclined surface. The inclined surface(s) or each inclined surface may be a relatively flat surface or a curved surface. Furthermore, it will also be appreciated that one of these first and second surfaces may be configured to roll when in abutting connection with the other.

According to another aspect, the present disclosure provides a damping hinge for controlled closing of a door or gate, the damping hinge comprising: a first clamp plate and a second clamp plate interconnected with one another for relative rotation about a vertical hinge axis, wherein one of the first clamp plate and second clamp plate is to be mounted to a panel of the door or gate and the other of the first and second clamp plate is to be mounted to a supporting structure. A damping mechanism is arranged on the first clamp plate or second clamp plate and includes a damper that extends substantially parallel to the hinge axis, with one end of the damper operatively connected to a fixed pressure member and an opposite end of the damper operatively connected to a movable pressure member that is movable vertically for transmitting force to the damper. The movable pressure member of the damping mechanism on the first or second clamp plate has a first surface configured for abutting connection with a second surface provided on an extension from the other of the first and second clamp plates.

The abutting connection between the first and second surfaces operates to move the movable pressure member upon relative rotation of the first and second clamp plates (i.e., about the hinge axis) towards a closed position of the door or gate to transmit force to the damper. In this way, therefore, the extension forms an actuator or actuating member or force transfer member that extends from the other clamp plate to engage with the movable pressure member. This actuator or actuating member presents the second surface (i.e., an actuating surface) for abutting connection with the first surface on the movable pressure member. The resistance (reaction) force exerted by the damper which retards or controls the closing action of the hinge is then transmitted or applied to this member at the abutting connection between the first and second surfaces.

It will be appreciated that the term "vertical" as used herein (i.e., throughout this specification) and variations thereof, such as "vertically," will be understood as references to orientations that are generally vertical as opposed to being mathematically precise orientations. Further, it will be appreciated that the term "vertical" and its variants as used herein refer to an in-use orientation of the hinge axis when the hinge is installed on a door or gate. Thus, that term as used herein is to be understood and interpreted with respect to such an in-use orientation of the hinge. In this context, therefore, it will be understood that the damper, which is arranged vertically in the damping mechanism, is arranged to extend substantially parallel to the hinge axis.

It will also be understood that the terms "first clamp plate" and "second clamp plate" as used herein refer to a respective plate element or plate member as well as to a respective assembly (i.e., a leaf assembly) of the damping hinge which is configured to clamp against a panel, e.g., a glass panel, of the hinged door/gate or against a supporting structure to which the associated door or gate is to be hingedly mounted. In this regard, it will be appreciated that the supporting structure to which the respective clamp plate (or leaf assembly) is configured to be mounted, and with respect to which the associated door or gate is hingedly mounted, may also comprise a panel, such as a glass panel. In some aspects, the only difference between the panels may therefore be that one panel (i.e., of the door or gate) is pivotally movable whereas the other panel is part of a fixed supporting structure.

Further, it will be appreciated that the term "abutting connection" as used herein in relation to the interaction between the first and second surfaces describes or refers to contact or engagement between those surfaces.

In an embodiment of the disclosure, the first surface is an inclined surface and/or the second surface is an inclined surface. In this regard, the inclined surface(s) or each inclined surface may be a substantially flat surface or a curved surface. In one embodiment, the inclined surface(s) or each inclined surface is a spiral inclined surface. The spiral angle of the spiral inclined surface(s) or each spiral inclined surface may, for example, be in the range of 5° to 85°. A spiral diameter of the spiral inclined surface(s) or each spiral inclined surface may be approximately equal to a rotation diameter of a position at which the spiral inclined surface may be located with respect to the hinge axis.

In an embodiment of the disclosure, the abutting connection provides either line contact or surface contact between the first surface and the second surface. For instance, the abutting connection between the first surface and the second surface provides sliding contact or rolling contact between the first and second surfaces. For example, the first and second surfaces may have complementary geometries for sliding contact. In another example, the first surface may comprise an outer periphery of a roller that is rotatably mounted on the movable pressure member for rolling engagement or rolling contact with the second surface.

In an embodiment of the disclosure, the hinge comprises a damper base that is provided on the clamp plate on which the damping mechanism is arranged. The damping mechanism is arranged or mounted on the damper base, such as in a damper groove formed on the damper base. The damper base may be configured and/or arranged to be received within a recess or cutout in the panel of the door/gate. Alternatively, the damper base may be arranged on the clamp plate such that the damping mechanism is to be positioned outside of a plane of the panel adjacent or next to an outer or facing surface of the panel. It will be understood that the phrase "outside of a plane of the panel" as used herein (i.e., throughout this specification) refers to a location that is not within the thickness or width of the panel; e.g. not within a cutout formed in the panel.

In an embodiment of the disclosure, a damping mechanism is arranged on each of the first clamp plate and the second clamp plate. Each damping mechanism includes a damper which is arranged to be substantially parallel to the hinge axis. One end of the damper on the first clamp plate is operatively connected to a fixed pressure block and an opposite end of the damper on the first clamp plate is operatively connected to a movable pressure block. Likewise, one end of the damper on the second clamp plate is operatively connected to a fixed pressure block and an opposite end of the damper on the second clamp plate is operatively connected to a movable pressure block. Accordingly, a first surface of the movable pressure block of the damping mechanism on the first clamp plate is configured for abutting connection with a second surface on an actuating extension from the second clamp plate; and a first surface of the movable pressure block of the damping mechanism on the second clamp plate is configured for abutting connection with a second surface on an actuating extension from the first clamp plate.

In an embodiment of the disclosure, the actuating extension from the second clamp plate may extend from the fixed pressure block of the damping mechanism on the second clamp plate. Similarly, the actuating extension from the first clamp plate may extend from the fixed pressure block of the damping mechanism on the first clamp plate.

In an embodiment of the disclosure, the damper(s) or each damper is a linear damper typically in the form of a piston-type damper, such as a hydraulic damper, with an upright or vertical pressure rod. The fixed pressure member or "block" to which one end of the damper is "operatively connected" operates to provide a fixed reaction surface against which that end of the damper may bear. The movable pressure member or "block" is movable in a vertical direction for applying or imparting a force to (and/or from) the damper at the other (i.e., opposite) end to which it is connected.

According to a further broad aspect, the disclosure provides a damping hinge for controlled closing of a door or gate, especially a glass door or gate, comprising: a first clamp plate configured to be mounted to a fixed supporting panel; a second clamp plate configured to be mounted to a panel of the door or gate, wherein the second clamp plate is connected with the first clamp plate for relative rotation thereto about a hinge axis; and a damping mechanism arranged on at least one of the first clamp plate and the second clamp plate and including a damper arranged substantially parallel to the hinge axis and configured to retard or control the relative rotation of the second clamp plate towards the first clamp plate during closing of the hinge. The damping mechanism may be arranged on the first or second clamp plate such that the damping mechanism is to be positioned outside of a plane of the respective panel (i.e., not within a cutout formed in the panel) adjacent or next to an outer or facing surface of the panel. This enables the hinge to be used on a glass panel that is simply drilled with circular holes instead of providing a cutout in the glass panel as required by many known damping hinges.

In an embodiment of the disclosure, the hinge comprises a damper base provided on the first or second clamp plate on which the damping mechanism is arranged, and the damping mechanism is arranged on the damper base, such as within a damper groove formed on the damper base. Thus, the damper base may be arranged in a hollow or cavity formed in the said clamp plate such that the damping mechanism can be positioned adjacent or next to the outer or facing surface of the respective panel.

In an embodiment, one end of the damper is operatively connected to a fixed pressure member and an opposite end of the damper is operatively connected to a movable pressure member that is configured to move vertically. The movable pressure member of the damping mechanism on the first or second clamp plate has a surface that engages with a surface of an actuating member extending from the other clamp plate for effecting movement of the movable pressure member in a vertical direction upon relative rotation of the second clamp plate towards the first clamp plate during closing of the door or gate.

According to yet another broad aspect, the present disclosure provides a damping hinge for controlled closing of a door or gate, comprising: a first clamp plate configured to be mounted to a supporting structure; a second clamp plate configured to be mounted to the door or gate, the second clamp plate connected with the first clamp plate for relative rotation thereto about a vertical hinge axis; and a damping mechanism arranged on the first clamp plate or the second clamp plate and including a damper arranged substantially parallel to the hinge axis, with one end of the damper operatively connected to a fixed pressure member and an opposite end of the damper operatively connected to a movable pressure member that is movable in a vertical direction. The movable pressure member of the damping mechanism on the first or second clamp plate has a surface which engages with a surface from the other clamp plate for effecting movement of the movable pressure member in the vertical direction upon relative rotation of the second clamp plate towards the first clamp plate to transmit force to the damper during closing of the door or gate.

In an embodiment of the disclosure, the damping hinge comprises a damper base provided on said clamp plate on which the damping mechanism is arranged. The damper base may be configured to be received or housed within a recess or cutout in the glass panel of the door or gate, e.g., in an insert component for the recess or cutout, and the damping mechanism is arranged on the damper base, such as within a damper groove formed on the damper base.

In an embodiment of the disclosure, the damping mechanism is arranged on said clamp plate such that it is configured to be positioned outside of a plane of the glass panel of the door or gate; e.g., adjacent or next to an outer or facing surface of the glass panel. In this way, the damping mechanism is not required to be received or housed within a recess or cutout in the glass panel, e.g., in an insert component in the cutout. Instead, a hinge of this embodiment may be used with a glass door panel that is simply drilled with circular holes, instead of providing a mouse-ear shaped cutout. The damping mechanism can then be arranged adjacent or next to an outer or facing surface of the glass panel.

In an embodiment of the disclosure, a damping mechanism is arranged on each of the first clamp plate and the second clamp plate. The one end of the damper on the first clamp plate is connected to the fixed pressure block and the opposite end of the damper on the first clamp plate is connected to the movable pressure block. Likewise, the one end of the damper on the second clamp plate is connected to a fixed pressure block and the opposite end of the damper on the second clamp plate is connected to a movable pressure block. The first surface of the movable pressure block of the damping mechanism on the first clamp plate is configured for abutting connection with the second inclined surface of an extension portion (e.g., actuating member) that extends from the fixed pressure block of the damping mechanism on the second clamp plate. Similarly, in this embodiment, a first inclined surface of the movable pressure block of the damping mechanism on the second clamp plate is configured for abutting connection with a second inclined surface of an extension portion that extends from the fixed pressure block of the damping mechanism on the first clamp plate.

In at least one embodiment, the disclosure provides a damping hinge for controlled closing of a glass door or gate. The damping hinge includes a first clamp plate configured to be mounted to a supporting structure; a second clamp plate configured to be mounted to a panel of the door or gate, wherein the second clamp plate is connected with the first clamp plate for relative rotation thereto about a hinge axis; and a damping mechanism arranged on the first clamp plate or the second clamp plate and having a damper that extends substantially parallel to the hinge axis. One end of the damper is operatively connected to a fixed pressure block and an opposite end of the damper is operatively connected to a movable pressure block that is movable vertically to transmit force to the damper. The hinge further includes an actuator or actuating member that extends towards the clamp plate on which the damping mechanism is arranged from the other clamp plate for operatively engaging with the movable pressure block. The movable pressure block has a roller configured for rolling engagement with the actuator or actuating member. This engagement between the actuating member and the roller causes or effects movement of the movable pressure block vertically upon relative rotation of the second clamp plate towards the first clamp plate about the hinge axis. This operates to transmit force to the damper which, in turn, retards or controls closing of the hinge.

According to a further broad aspect, the disclosure provides a damping hinge for controlled closing of a door or gate, comprising: a first clamp plate configured to be mounted to a fixed supporting panel; a second clamp plate configured to be mounted to a panel of the door or gate, wherein the second clamp plate is connected with the first clamp plate for relative rotation thereto about a hinge axis; and a damping mechanism arranged on at least one of the first clamp plate and the second clamp plate including a damper arranged substantially parallel to the hinge axis and configured to retard or control relative rotation of the second clamp plate towards the first clamp plate during closing of the hinge. A movable pressure member at one end of the damper is movable in a vertical direction to transmit a force to the damper during closing of the door or gate.

In an embodiment, the movable pressure member includes a follower roller which is configured to engage with a surface of an actuating member extending from the other clamp plate to effect vertical movement of the movable pressure member upon relative rotation of the second clamp plate towards the first clamp plate.

In an embodiment of the hinge, the movable pressure member is configured for rolling movement in the clamp plate in the vertical direction to transmit the force to the damper.

In an embodiment, the movable pressure member includes at least guide roller in rolling engagement with a wall or a surface of the clamp plate for rolling movement in the vertical direction to transmit the force to the damper. The at least one guide roller may be in rolling contact or engagement with the follower roller.

In an embodiment of the hinge, the at least one guide roller has a larger diameter portion in rolling engagement with the follower roller and a smaller diameter portion in rolling or engagement with the wall or surface of the clamp plate for rolling movement in the vertical direction.

In an embodiment, the damping hinge further comprises a damping adjustment device having an element, such as an adjustment screw, for setting an effective stroke or a working stroke of the damper; for example, via a pre-compression of the damper.

Applying pressure to the pressure rod of a damper from an angle exceeding 3° offset from a longitudinal axis of the rod should be avoided when the damper is working or experiencing force on the pressure rod, because such oblique force angles can cause excessive wear and/or damage to the damper. In the damping hinge according to the disclosure, the one or more damping mechanisms is/are arranged in the first clamp plate and/or the second clamp plate. The two opposite ends of the piston-type damper are respectively connected to the fixed pressure member and the movable pressure member; and the movable pressure member moves in a vertical direction which thus applies a vertically acting force on the damper. In this way, the vertical force application is able to minimize or avoid an undesired oblique force application, thereby improving the damping effect and service life of the damper. The horizontal pivoting movement of the first and second clamp plates about the hinge axis in the damping hinge means that the first inclined surface of the movable pressure member is in, or able to maintain, abutting connection with the second inclined surface on the other clamp plate. When the first and second clamp plates pivot or rotate horizontally about the hinge axis, the interacting forces between the first and second inclined surfaces means that each movable pressure member undergoes vertical motion, which thereby drives the damper(s) to expand and contract vertically. Thus, in the damping hinge according to the disclosure, the one or more damping mechanisms is/are arranged in such a way that the pressure or force application to and/or from the damper can be maintained essentially in alignment with the pressure rod. In this way, the damping hinge can avoid the oblique force angles that can cause wear and damage to the damper.

BRIEF DESCRIPTION OF THE FIGURES

For a more complete understanding of the disclosure, exemplary embodiments of the disclosure are explained in more detail in the following description with reference to the accompanying drawing figures, in which like reference signs designate like parts, and in which.

DETAILED DESCRIPTION

Figure 1:
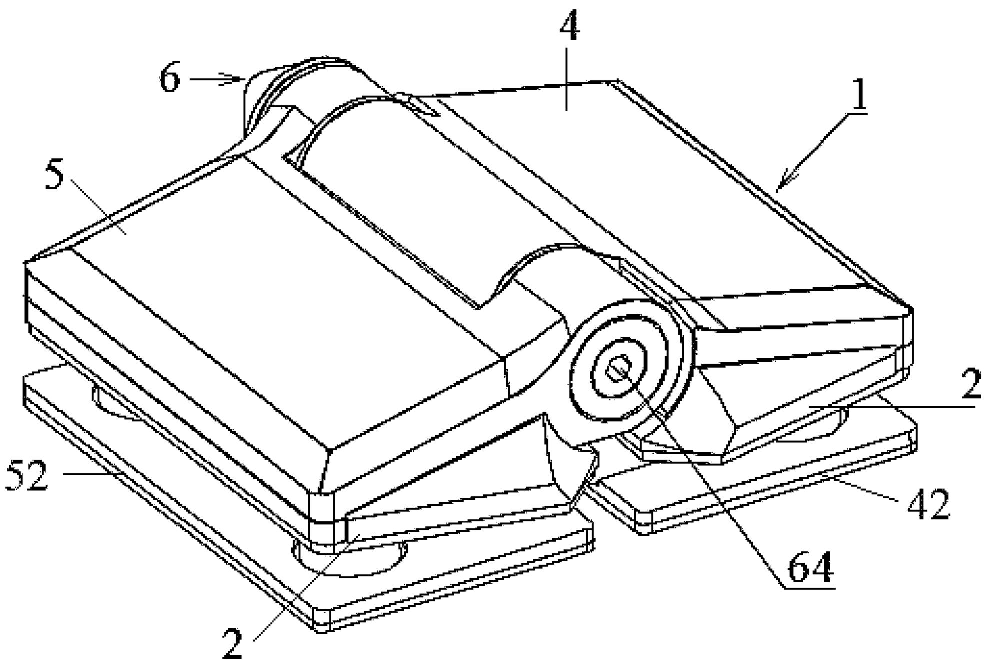
FIG. 1 is an overall perspective view of a damping hinge according to an embodiment.

The accompanying drawings are included to provide a further understanding of the present disclosure and are incorporated in and constitute a part of this specification. The drawings illustrate some embodiments of the disclosure and together with the description serve to explain the principles of the disclosure. Other embodiments of the disclosure and many attendant aspects of the disclosure will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other.

Referring to FIG. 1 to FIG. 8, a damping hinge 1 comprises a first clamp plate 4 and a second clamp plate 5, wherein one or more damping mechanisms 3 are arranged in the first clamp plate 4 and/or the second clamp plate 5. The damping mechanism 3 includes a fixed pressure block 31, a movable pressure block 32 which is able to move in a vertical direction, and a damper 33 which is arranged vertically and has two ends connected to the fixed pressure block 31 and the movable pressure block 32, respectively. A first inclined surface 34 on the movable pressure block 32 is in abutting connection with a second inclined surface 35 on the other clamp plate 5.

It will be appreciated that the following three cases apply where one or more damping mechanisms 3 are arranged in the first clamp plate 4 and/or the second clamp plate 5: (i) a damping mechanism 3 is arranged in the first clamp plate 4; or, (ii) a damping mechanism 3 is arranged in the second clamp plate 5; or, (iii) damping mechanisms 3 are arranged in both the first and second clamp plates 4, 5. Therefore, a first inclined surface on the movable pressure block in abutting connection with a second inclined surface on the other clamp plate can be understood as follows: In the case (i) above, the first inclined surface 34 on the movable pressure block 32 in the first clamp plate 4 is in abutting connection with the second inclined surface 35 on the second clamp plate 5; e.g. the second inclined surface 35 is provided on an extension 35' on the second clamp plate 5; or, the case (ii) above, the first inclined surface 34 of the movable pressure block 32 in the second clamp plate 5 is in abutting connection with the second inclined surface 35 of the first clamp plate 4; e.g., the second inclined surface 35 is provided on an extension 35' on the first clamp plate 4; or, in the case (iii) above, the first inclined surface 34 of the movable pressure block 32 on the first clamp plate 4 is in abutting connection with the second inclined surface 35 of the fixed pressure block 31 on the second clamp plate 5, and the first inclined surface 34 of the movable pressure block 32 on the second clamp plate assembly 5 is in abutting connection with the second inclined surface 35 of the fixed pressure block 31 on the first clamp plate assembly 4. Moreover, abutting connection can be understood as follows: The first inclined surface 34 abuts against the second inclined surface 35 from above; or the second inclined surface 35 abuts against the first inclined surface 34 from above. The phrase "from above" in this context is to be understood with respect to an in-use orientation of the hinge when the hinge is installed on a door or gate.

Furthermore, in an embodiment, the first inclined surface 34 and the second inclined surface 35 are spiral inclined surfaces configured for abutting contact with each other, with the spiral angle of the spiral inclined surfaces being in the range of 5° to 85° or fractions thereof. The spiral diameters of the spiral inclined surfaces 34, 35 are typically equal to the rotational diameters of the positions where the spiral inclined surfaces are located.

It should be noted that the spiral inclined surfaces which are configured for abutting contact with each other can refer to an upper inclined surface and a lower inclined surface that are cut along or follow the same spiral tangent, wherein one inclined surface may serve as the first inclined surface and the other inclined surface may serve as the second inclined surface.

From the above description, when the first clamp plate 4 and the second clamp plate 5 rotate relative to one another about the hinge axis, e.g., as the door closes, the first spiral inclined surface 34 and the second spiral inclined surface 35 are pressed upon each other to make the movable pressure block 32 continuously compress the damper. That is to say that the inclined surfaces 34, 35 rotate horizontally and, on the movable pressure block 32, move vertically at the same time. The spiral inclined surfaces may be simulated according to the movement paths of the inclined surfaces to cause the first inclined surface and the second inclined surface to always be in surface contact when pressed against each other. Compared with line-to-line or point-to-point contact, the resulting stress with surface contact is more uniform, the squeezing effect is more ideal, and wear damage to the two inclined surfaces can be minimized or avoided, thereby improving the damping effect and service life of the damper.

Furthermore, the total length of the first inclined surface and the second inclined surface may be either greater or less than the maximum rotation distance between the first clamp plate and the second clamp plate.

From the above description, when the first and second clamp plates 4, 5 are opened to the maximum extent, the first inclined surface 34 may still be in surface contact with the second inclined surface 35, so that the first clamp plate and the second clamp plate can be damped when they start to close, thereby providing a better damping effect. At the same time, compared to solutions where squeezing contact only occurs later during the rotation process, there is no phase of the hinge movement in this embodiment where the rotational force builds up until it reaches a certain level at which point only then does contact occur. This makes the whole closing process of the damping hinge much smoother and avoids damage to the two inclined surfaces which may otherwise be brought about by sudden application of stress.

Furthermore, the damper 33 may be a hydraulic damper which may include a vertical pressure rod 36. From the above description, the hydraulic damper 33 is used for damping, so that the damper has a good damping effect, makes less noise, is low in cost, convenient to install, highly practical, and easy to promote and use. Furthermore, the damping hinge may also include a damper base 2, in which a damper groove 21 can be formed and in which the damping mechanism 3 may be arranged.

From the above description, the damper groove has a fixing and limiting function as well as a protecting effect. In addition, with regard to the technical solution in which the entire damping mechanism 3 is arranged in the damper groove 21, setting the length of the damper groove to be smaller than that of the damping mechanism when the damper 33 is not compressed ensures that the damping mechanism 3 will not extend completely after being placed in the damping groove. This means that the damping mechanism 3 will apply a constant counter-force to the movable pressure block 32 and the fixed pressure block 31 to abut against both sides of the damper groove 21, thereby forming a clamping effect to a certain extent and giving an auxiliary fixing function. This acts to ensure stability of the damping mechanism 3 in the damper groove 21.

Furthermore, a holding slot 37 matched with the hydraulic damper may be formed in the fixed pressure block 31 of the damping hinge. A slide groove 38 may be formed along on a side of the fixed pressure block 31 that faces or is close to the moveable pressure block 32 and a slide rod 39 may extend from a side of the moveable pressure block 32 that faces or is close to the fixed pressure block 31. In this way, the slide rod 39 and slide groove 38 connect vertically and interact to guide movement of the moveable pressure block 32 along the slide groove 38.

From the above description, it will be appreciated that one end of the hydraulic damper 33 is mounted stationary in the holding slot, i.e., connected with the fixed pressure block 31, which has a dual purpose and effect of fixing or limiting, as well as protecting. The slide groove 38 in the fixed pressure block 31 is matched with the slide rod 39 on the movable pressure block 32. The slide rod 39 connects to the slide groove 38 vertically, so that the movable pressure block 32 acts in a vertical direction on the pressure rod 36 of the hydraulic damper 33. Moreover, the limiting from the holding slot and the guidance from the slide groove holding slot means that the pressure rod 36 of the damper is always compressed in a vertical direction, thereby improving the damping effect and service life of the damper.

Furthermore, the damping mechanisms 3 may be arranged both in the first clamp plate 4 and in the second clamp plate 5. The pressure rod 36 of the damper 33 on the first clamp plate 4 may be vertically connected to the movable pressure block 32; and the pressure rod 36 of the damper 33 on the second clamp plate 5 may be vertically connected to the bottom of the holding slot 37. The first inclined surface 34 of the movable pressure block 32 on the first clamp plate 4 is in abutting connection with the second inclined surface 35 which is provided on an extension 35' from the fixed pressure block 31 on the second clamp plate 5. Each extension 35' effectively operates as an actuator or an actuating member for moving the respective movable pressure block 32 via the abutting connection of the first and second inclined surfaces 34, 35.

It should be noted that, in the same way, the pressure rod 36 of the damper 33 on the second clamp plate 5 may be vertically connected to the movable pressure block 32 and the pressure rod 36 of the damper 33 on the first clamp plate assembly 4 may be vertically connected to the bottom of the holding slot 37.

Existing damping hinges generally adopt horizontal hydraulic dampers. Although the hydraulic dampers are sealed, daily use may cause hydraulic fluid to slightly overflow from openings due to compression and gravity acting on the horizontal hydraulic dampers, thus often resulting in fluid leakage.

From the above description, it will be noted that the damping mechanisms 3 on the first clamp plate and the second clamp plate may be rotationally symmetrical, so that the first inclined surfaces and the second inclined surfaces can work together as they exert pressure on one another. That is to say, when the movable pressure block of the clamp plate on one side is located above, the fixed pressure block of the clamp plate on the other side is also located above. On this basis, the pressure rods of the two clamp plate assemblies are kept in the same direction when connected to different pressure blocks and the pressure rods on both sides are kept upright. The openings of the hydraulic dampers are formed in the same sides as the corresponding pressure rods. That is to say, the hydraulic dampers in this embodiment open upwards. For this reason, and because the dampers are compressed vertically, hydraulic fluid leakage can be effectively avoided, which improves the damping effect and service life of the dampers.

From the above description, it will be appreciated that the damper mechanism 3 may be arranged on only one clamp plate and the second inclined surface 35 matched with the first inclined surface 34 is arranged on the other clamp plate. For example, the damping mechanism 3 may be arranged in the first clamp plate 4. In that case, the second inclined surface 35 may be arranged on an extending portion 35' of the second clamp plate assembly 5, close to the first inclined surface 34. The fixed pressure block 31 may have a limit portion matched with the hydraulic damper 33 and the damper groove may be formed with a slide notch for holding both sides of the movable pressure block all the times. In this way, the movable pressure block 32 is always held in the slide notch in order to limit the motion of the movable pressure block 32 as it moves vertically, thereby achieving both limiting and guiding effects.

In a particular embodiment, the movable pressure block may include two symmetrical first inclined surfaces, and two respective second inclined surfaces may be connected to the first inclined surfaces from their arrangement on an extension portion of the second clamp plate assembly. In this way, although the damping mechanism may be arranged on only one clamp plate, the first clamp plate assembly and second clamp plate assembly may rotate relative to one another in two directions of the hinge through the configuration of the symmetrical inclined surfaces.

In an embodiment, the damping mechanism 3 is detachably connected to the damper base 2. From the above description, the detachable connection results in the damping mechanism being easy to detach, maintain, and replace, thereby improving user experience of the damping hinge.

Referring to FIG. 1 to FIG. 6, a first embodiment (Embodiment 1) of the disclosure is as follows:

A damping hinge 1 according to this embodiment is suitable for connecting two portions of a machine, a vehicle, a door, a window, or other implements, and is also suitable for the rotation and controlled closing of glass doors.

The damping hinge is composed of a hinge body 1 which includes a first clamp plate 4, a second clamp plate 5, damping mechanisms 3 respectively arranged in the first clamp plate 4 and the second clamp plate 5, and damper bases 2 corresponding to the damping mechanisms 3. One of the first clamp plate 4 and the second clamp plate 5 may be mounted to a glass door (not shown) and the other of the first clamp plate 4 and the second clamp plate 5 may be mounted to a supporting structure, such as a fixed glass panel. Damper grooves 21 are formed in the damper bases 2, the damping mechanisms 3 are arranged in the damper grooves 21, and the length of the damper grooves 21 is set to be smaller than that of the damping mechanisms 3 when dampers 33 are not compressed, so that the damping mechanisms 3 will not extend completely after being placed in the damper grooves 21 and will apply a counter-thrust to movable pressure blocks and fixed pressure blocks to abut against two sides of the damper grooves 21 in order to achieve a clamping effect to a certain extent for auxiliary fixing, thereby ensuring the stability of the damping mechanisms 3 in the damper grooves 21.

In this embodiment, the dampers 33 are hydraulic dampers, and each hydraulic damper includes an upright pressure rod 36.

Figure 5:
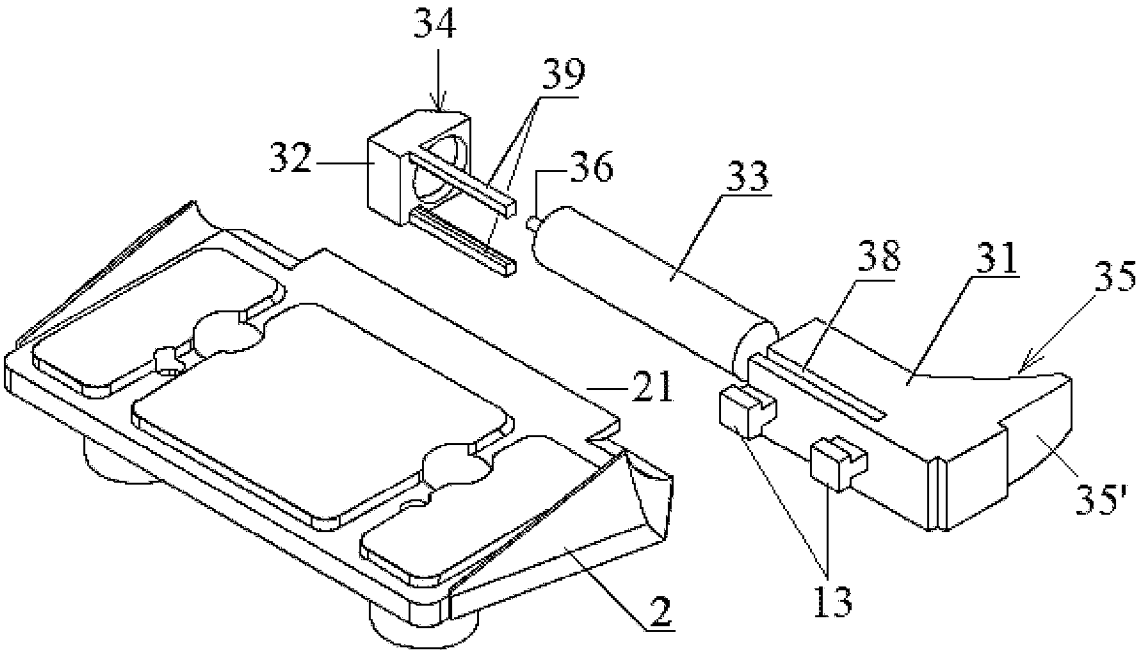
FIG. 5 is a perspective view showing the cooperation of a damper base and a damping mechanism for use in an embodiment.
Figure 6:
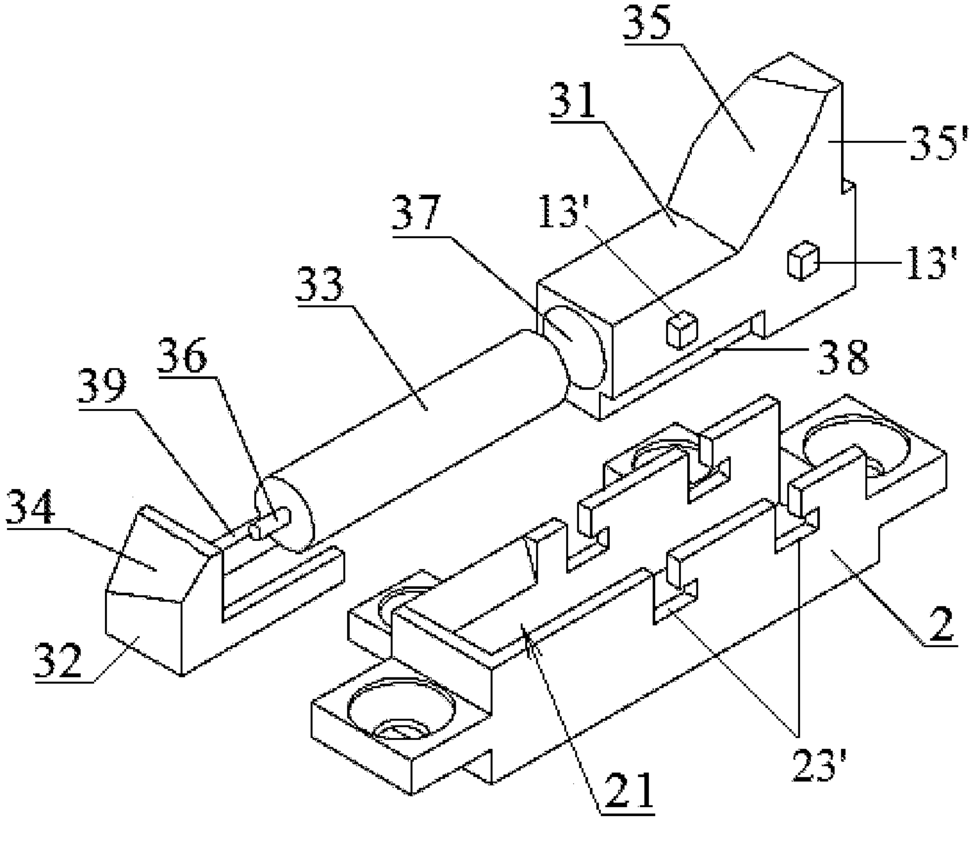
FIG. 6 is a perspective view showing the cooperation of a damper base and a damping mechanism for use in an embodiment.

As shown in FIG. 5 and FIG. 6, each damping mechanism 3 includes one fixed pressure block 31, one movable pressure block 32, and one damper 33, wherein the two ends of the damper 33 are vertically connected to the fixed pressure block 31 and the movable pressure block 32, respectively. The movable pressure block 32 moves in a vertical direction to apply a vertically directed force to the damper 33 which is arranged vertically. A first inclined surface 34 of the movable pressure block 32 is in abutting connection with a second inclined surface 35 of the fixed pressure block 31 of the other clamp plate, so that the movable pressure block 32 and the corresponding fixed pressure block 31 can move vertically to drive the damper 33 to retract and extend vertically.

As shown in FIG. 5 and FIG. 6, the first inclined surface 34 of the movable pressure block 32 on the first clamp plate 4 is in abutting connection with the second inclined surface 35 of the fixed pressure block 31 on the second clamp plate 5. The first inclined surface 34 of the movable pressure block 32 on the second clamp plate assembly 5 is in abutting connection with the second inclined surface 35 of the fixed pressure block 31 on the first clamp plate 4 and the second inclined surface 35 abuts against the first inclined surface 34 from above. In other embodiments, the first inclined surfaces 34 may abut against the second inclined surfaces 35 from above.

As shown in FIG. 5 and FIG. 6, the first inclined surface 34 and the second inclined surface 35 are spiral inclined surfaces. The spiral angle of the spiral inclined surfaces is between 5° and 85°, and the spiral diameters of the spiral inclined surfaces are equal to the rotation diameters of positions where the spiral inclined surfaces are located. That is to say that the spiral inclined surfaces are simulated according to the movement paths of the inclined surfaces to make sure that the first inclined surface 34 and the second inclined surface 35 are always in surface contact when they press against one another. This makes for better compression effect and also avoids damage to either of the two inclined surfaces, thereby ensuring the damping effect and service life of the damper 33.

As shown in FIG. 5 and FIG. 6, the total length of the first inclined surface 34 and the second inclined surface 35 is either greater or less than a maximum rotation distance between the first clamp plate 4 and the second clamp plate 5. In this embodiment, the first inclined surface 34 of the movable pressure block 32 is relatively short. The length of the whole movable pressure block 32 corresponds to the upper half of the fixed pressure block 31. The second inclined surface 35 is provided on an extension 35' which extends from the lower half of the fixed pressure block 31 (of the damping mechanism 3 on the other clamp plate) and is relatively long. In other embodiments, the length of the first inclined surface 34 and the length of the second inclined surface 35 can be set as one wishes, but the total length of the first inclined surface 34 and the second inclined surface 35 should be greater than the maximum hinged rotation distance between the first clamp plate 4 and the second clamp plate 5 to ensure that the first inclined surface 34 is still in surface contact with the second inclined surface 35 when the first clamp plate 4 and the second clamp plate 5 are opened to the maximum extent.

In another embodiment, the first inclined surface 34 and the second inclined surface 35 only engage in surface contact during part of the rotational movement between the first clamp plate 4 and the second clamp plate 5. That is to say, rotational movement between the first clamp plate 4 and the second clamp plate 5 of the hinge is divided into two stages: the first stage is when the rotation of the hinge is allowed to accelerate during closing of the hinge (e.g. from a fully open position) where the first inclined surface 34 and the second inclined surface 35 have not come into surface contact; the second stage is when the first inclined surface 34 and the second inclined surface 35 come into surface contact to achieve a damping effect. In this embodiment, the total length of the first inclined surface 34 and the second inclined surface 35 is either less than or equal to the maximum hinge rotation distance between the first clamp plate 4 and the second clamp plate 5.

Figure 2:
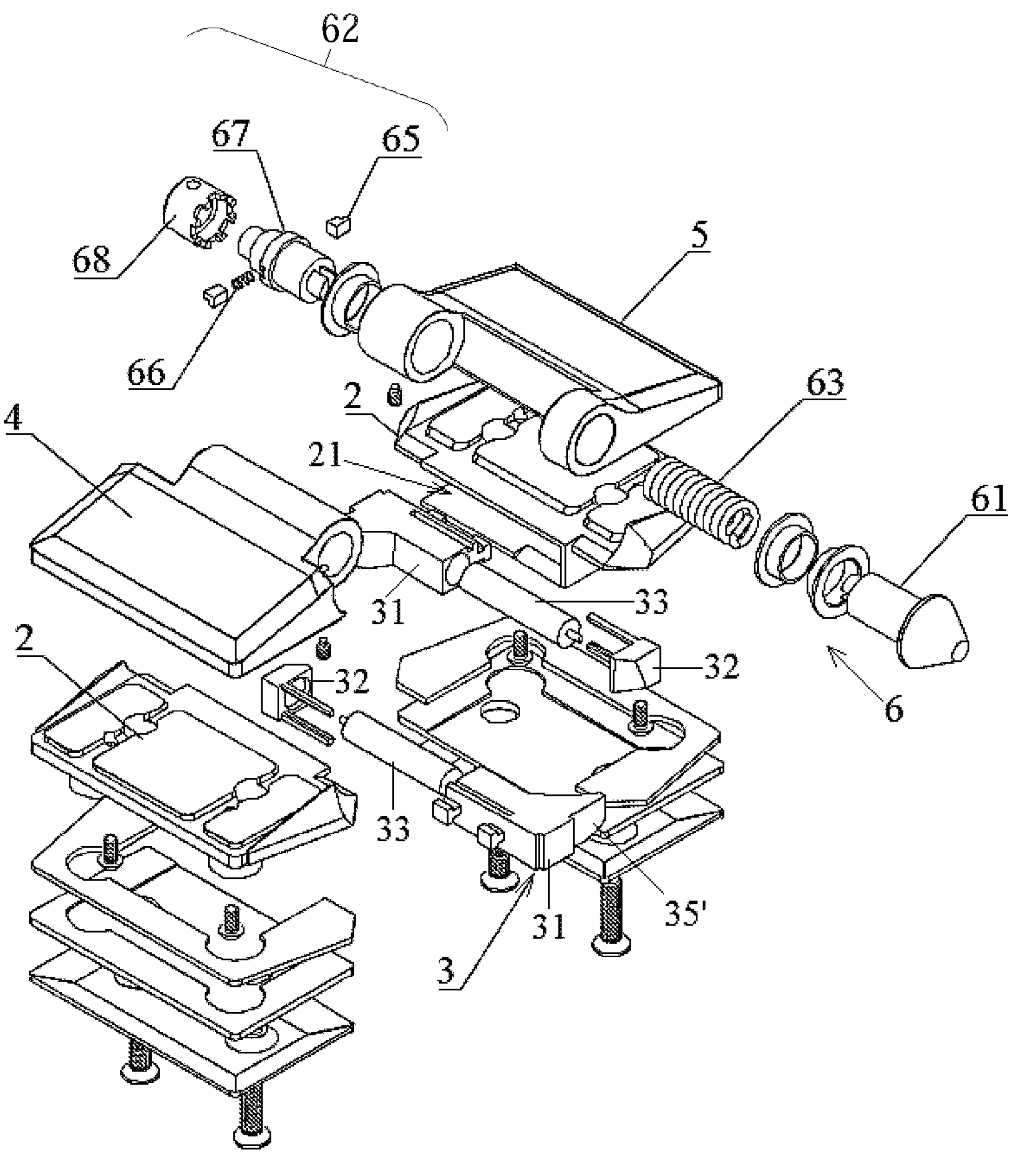
FIG. 2 is an exploded or disassembled view of the damping hinge of the embodiment of FIG. 1.
Figure 3:
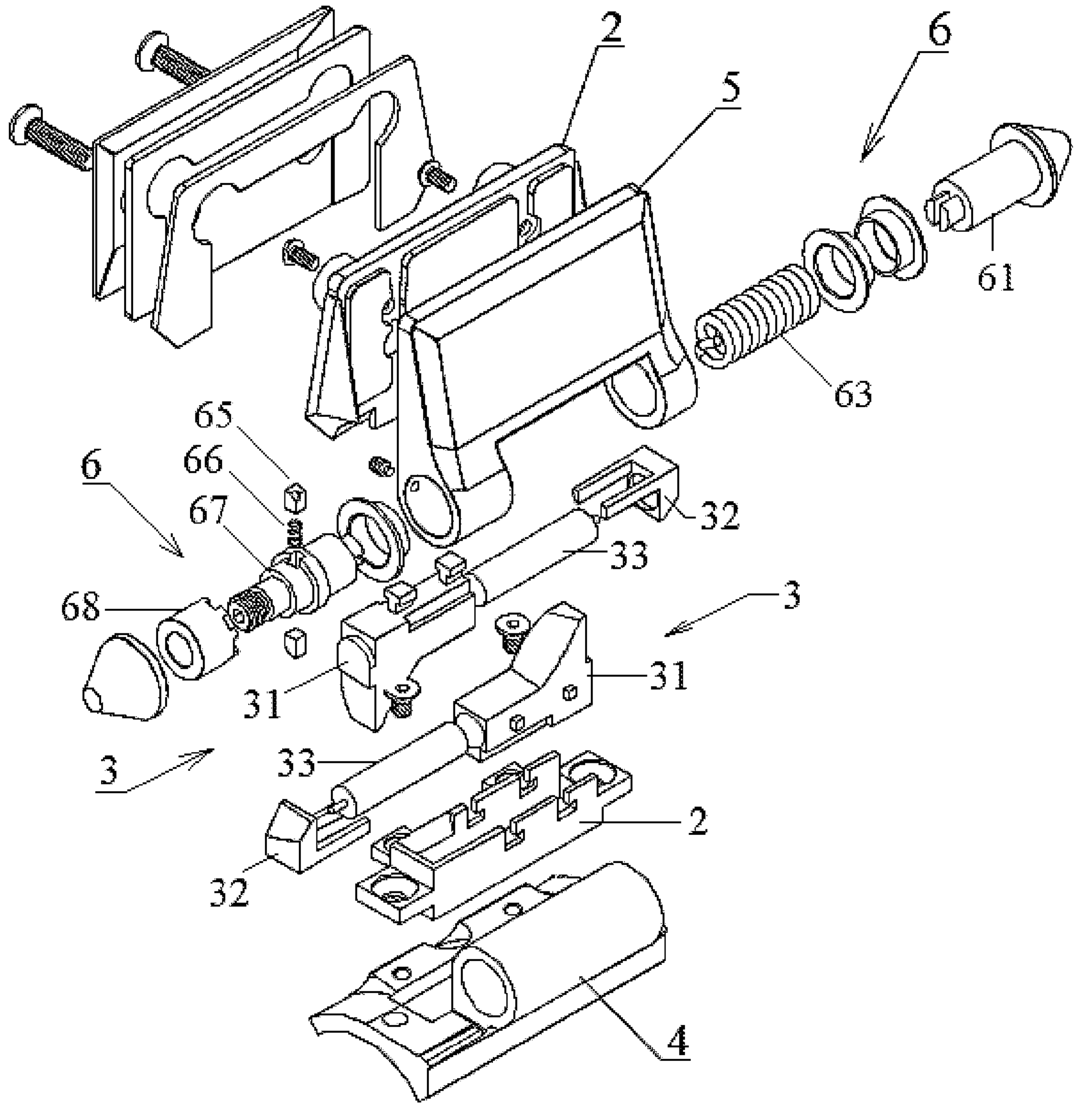
FIG. 3 is an exploded or disassembled view of a damping hinge according to another embodiment.
Figure 4:
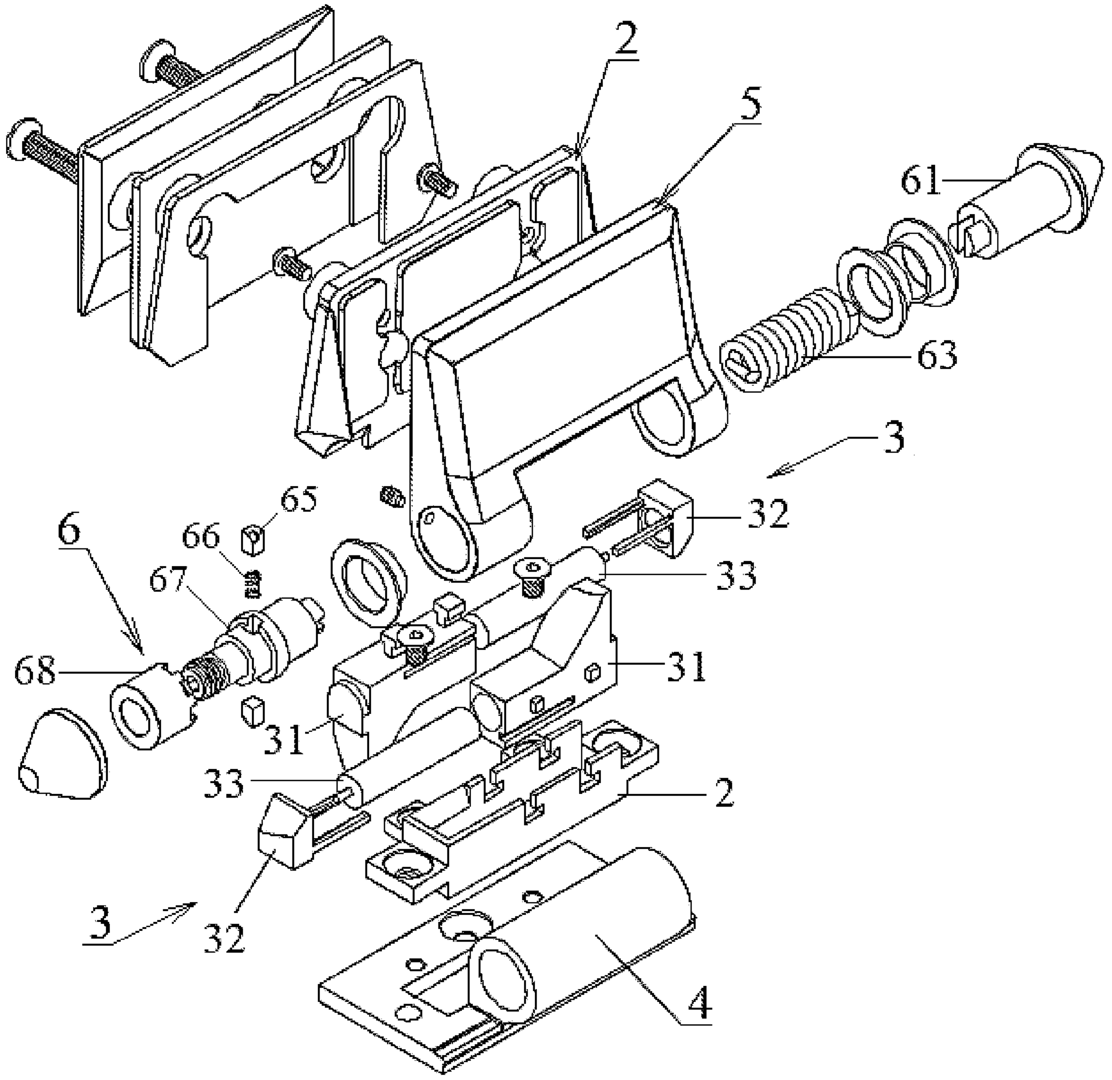
FIG. 4 is an exploded or disassembled view of the damping hinge according to a further embodiment.

As shown in the three embodiments of FIG. 2 to FIG. 4, the second clamp plates 5 are identical in structure and the first clamp plates 4 are different in structure. This includes the two-way rotation in the embodiment of FIG. 2, in which either of the first and second clamp plate assemblies 4, 5 may be mounted to the door, and the one-way rotation in the embodiment of in FIG. 3 which has one clamp plate 4 configured to be fixed axially mounted while the other clamp plate 5 is able to rotate, as well as the embodiment of FIG. 4, which again has flat surface mounting plate 4 and single leaf rotation via the clamp plate 5. It can be seen in the embodiment of FIGS. 1 and 2, that either the second clamp plate 5 and/or the first clamp plate 4 may rotate relative to the other. That is to say, one or both of the first clamp plate 4 and the second clamp plate 5 is/are able to rotate. Furthermore, the specific shape and structure of the second clamp plate 5 as well as the specific shape and structure of the first clamp plate 4 are not limited to those shown in these drawings.

At the same time, as shown in FIG. 2 to FIG. 4, the damping mechanisms 3 in both clamp plates 4, 5 are substantially identical in structure and are installed in a rotationally symmetrical way. Under such circumstances, only one set of tooling is required for manufacturing one set of damping mechanisms 3, which may be useful for assembly and production as well as for subsequent maintenance and/or replacement. In addition, arranging the damping mechanisms 3 symmetrically on both sides ensures that hinge closing force applies better compression to the damper 33.

Referring to FIG. 1 to FIG. 6, another embodiment (Embodiment 2) of the disclosure is as follows. As above, the damping hinge in this embodiment is suitable for connecting two portions of a machine, vehicle, door, window, or other implements, and is especially suitable for the hinged rotation of glass doors.

Based on Embodiment 1, as shown in FIG. 5 and FIG. 6, a holding slot 37 matched with the hydraulic damper 33 is formed in the fixed pressure block 31 of the damping hinge and slide grooves 38 are formed in the side of the fixed pressure block 31 close to or extending towards the movable pressure block 32. Slide rods 39 stretch out of a side of the movable pressure block 32 close to or facing the fixed pressure block 31 and slide vertically to connect with or for insertion into the slide grooves 38. In this way, the movable pressure block 32 is limited by the holding slot 37 and is guided by the slide grooves 38 to move vertically.

As shown in FIG. 5 and FIG. 6, the slide grooves 38 are lateral notches or recesses and the slide rods 39 are complementary square-shaped rods. In other embodiments, the slide grooves 38 could also be slide holes and the slide rods 39 could be complementary cylindrical rods; or, alternatively, the slide grooves 38 could be provided as slide rails and the slide rods 39 could be slide blocks or other sliders for making the movable pressure blocks 32 slide in a certain direction.

In this embodiment, the pressure rods 36 of the dampers 33 on the left and right sides of the hinge (i.e., on each of the two clamp plates 4, 5) are connected to the movable pressure blocks 32. In other optional embodiments, the pressure rods 36 of the dampers 33 on the left and/or right sides may be connected to the fixed pressure blocks 31.

Referring to FIG. 1, a further embodiment (Embodiment 3) of the disclosure is as follows. Again, the damping hinge in this embodiment is suitable for interconnecting two portions of a machine, vehicle, door, window, or other implements, and especially suitable for the hinged rotation of glass doors.

Based on Embodiment 2, the connection of the pressure rods 36 of the dampers 33 and the pressure blocks 31, 32 of the damping hinge in this embodiment is limited and substituted as follows: The pressure rod 36 of the damper 33 in damping mechanism 3 on the first clamp plate assembly 4 is vertically connected to the movable pressure block 32, and the pressure rod 36 of the damper 33 in the damping mechanism 3 on the second clamp plate 5 is vertically connected to the bottom of the holding slot 37. As an alternative, the pressure rod 36 of the damper 33 in the damping mechanism 3 on the second clamp plate 5 is vertically connected to the movable pressure block 32 and the pressure rod 36 of the damper 33 in the damping mechanism 3 on the first clamp plate 4 is vertically connected to the bottom of the holding slot 37. In this way, the pressure rods 36 of the dampers 33 in the damping mechanisms 3 on the two clamp plates 4, 5 are kept in the same orientation when connected to their respective pressure blocks 31, 32, so that both pressure rods 36 on the left and right sides are kept in an upright position. As an opening of each hydraulic damper 33 is formed in a side where the pressure rod 36 is located, this means that the hydraulic dampers in this embodiment can be arranged to have upwards facing openings, and to be compressed vertically, thereby effectively preventing hydraulic leakage and improving the damping effect and service life of the dampers 33.

Figure 8:
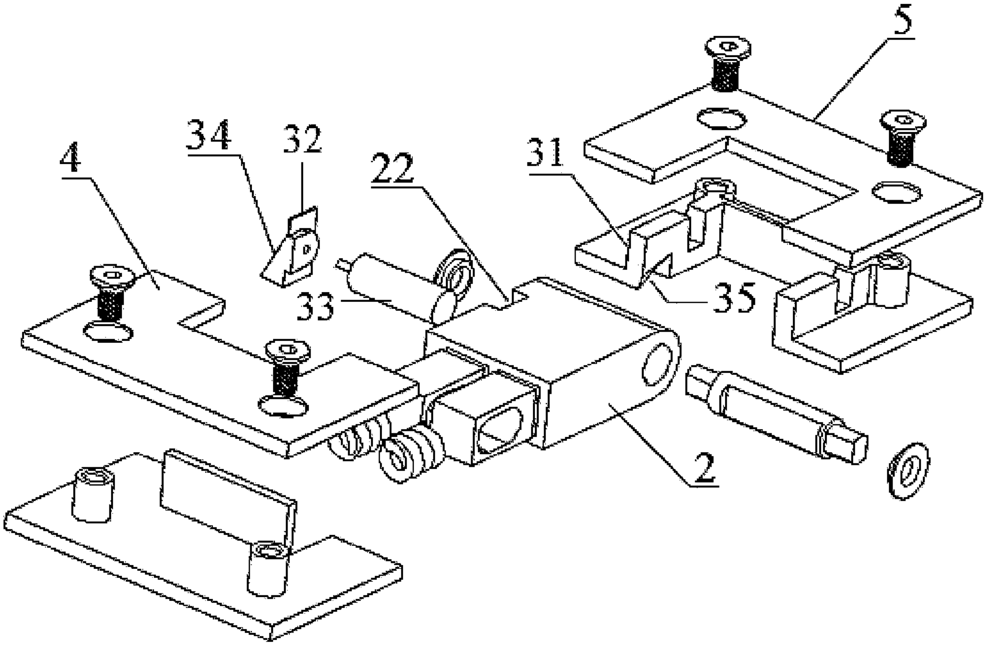
FIG. 8 is an exploded or disassembled view of a damping hinge according to still another embodiment.
Figure 9:
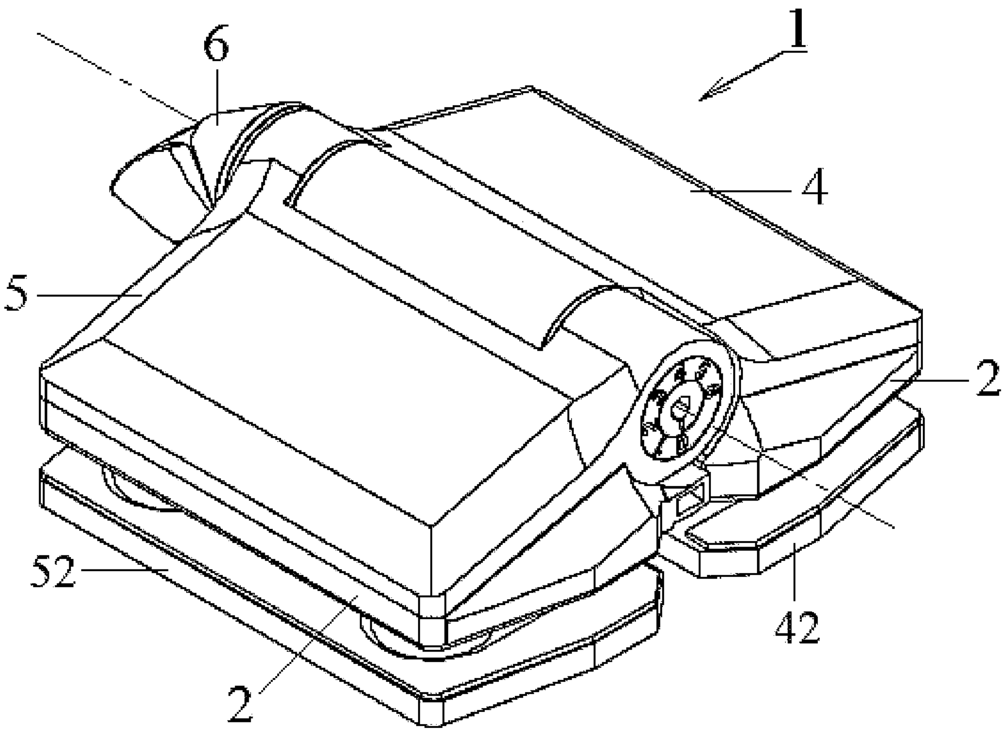
FIG. 9 is a perspective view of a damping hinge according to yet a further embodiment.
Figure 10:
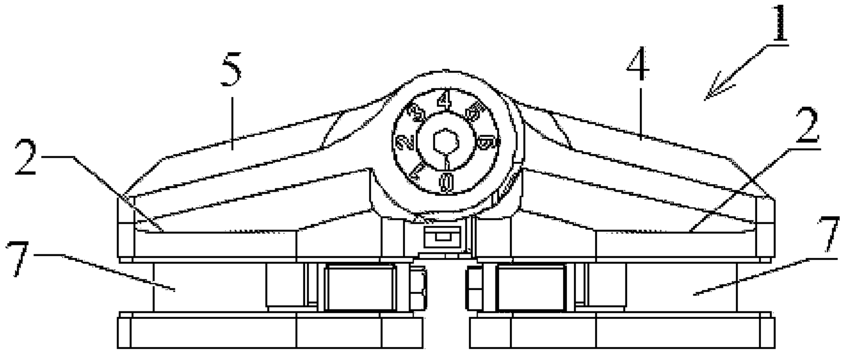
FIG. 10 is a bottom end view of the damping hinge of the embodiment of FIG. 9.
Figure 11:
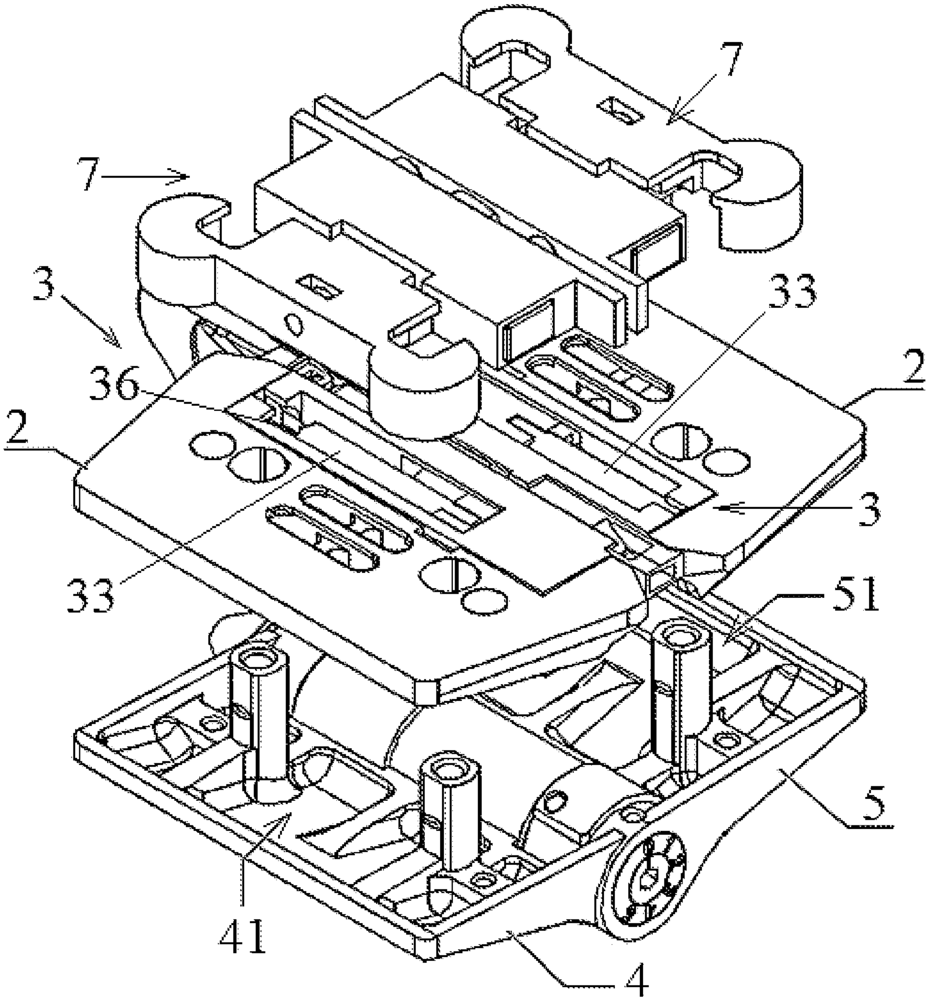
FIG. 11 is a partially exploded or disassembled view of the damping hinge in FIG. 9.
Figure 12:
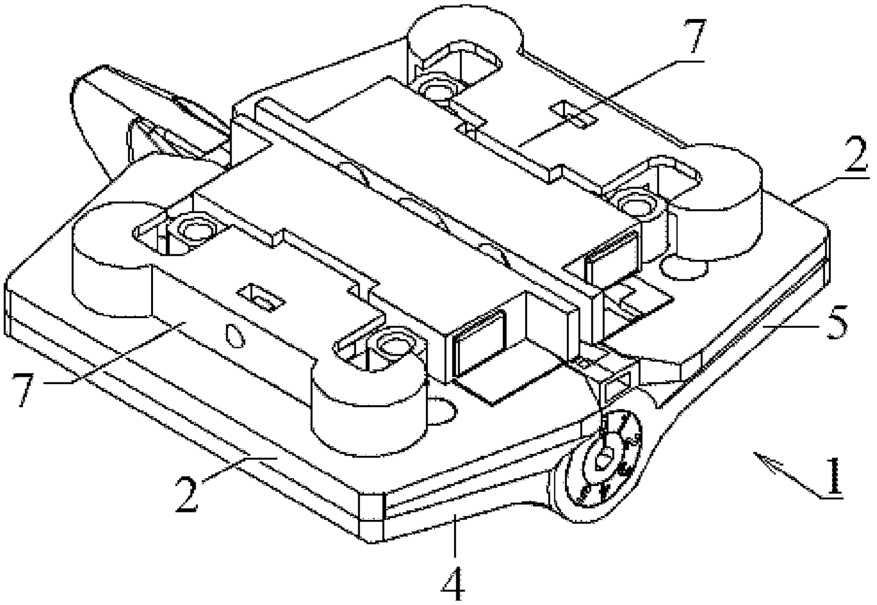
FIG. 12 is a partially disassembled view of the damping hinge in FIG. 9.

Referring to FIG. 8, yet another embodiment (Embodiment 4) of the disclosure is as follows. The damped hinge in this embodiment is again suitable for interconnecting two portions of a machine, a vehicle, a door, a window, or other articles, and is especially suitable for hinged rotation of glass doors.

Based on Embodiment 1, in this embodiment, the damping mechanism 3 and the damper base 2 corresponding to the damping mechanism 3 are arranged in either the first clamp plate 4 or the second clamp plate 5 of the damping hinge. That is, only one damping mechanism 3 is installed. The damping mechanism 3 and the damper base 2 corresponding to the damping mechanism 3 installed on the first clamp plate 4 will now serve as an example for explanation purposes. In this case, the first inclined surface 34 is only arranged on the movable pressure block 32 of the damping mechanism 3 and the second inclined surface 35 extends in a fixed manner on the second clamp plate 5 for corresponding to a position of the first inclined surface 34 so as to match with the first inclined surface 34.

On this basis, in this embodiment, the fixed pressure block 31 has a limit portion (not shown in the diagram) that is matched with the hydraulic damper and installed in a fixed position in the damper base 2. The damper groove 21 is desirably formed with a slide notch 22 so as to always clamp both sides of the movable pressure block 32. This means that the movable pressure block 32 will always move in a vertical direction.

Figure 7:
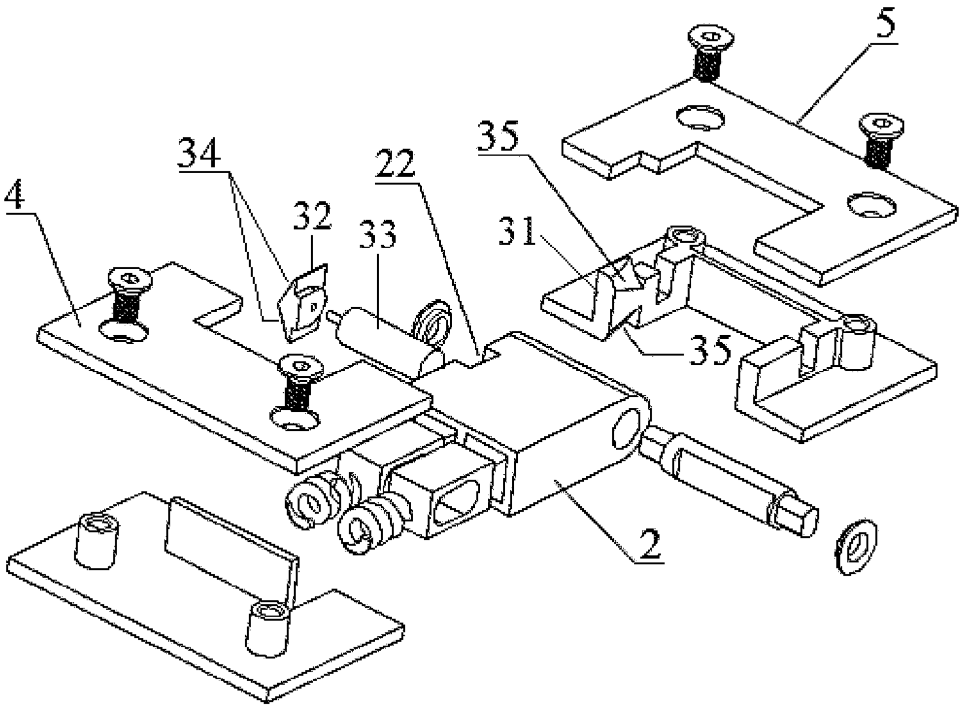
FIG. 7 is an exploded or disassembled view of a damping hinge according to yet another embodiment.

Referring to FIG. 7, yet another embodiment (Embodiment 5) of the disclosure is shown as follows. The damping hinge in this embodiment is once again suitable for connecting two portions of a machine, vehicle, door, window, or other implements, and especially suitable for the hinged rotation of glass shower doors.

Based on Embodiment 4, the movable pressure block 32 of the damping hinge in this embodiment includes two symmetrical first inclined surfaces 34. An extending portion of the second clamp plate 5 is correspondingly fitted or provided with two second inclined surfaces 35 that are configured to connect or abut cooperatively with each of the first inclined surfaces 34, depending on the direction of relative rotation of the hinge.

Referring to FIG. 1 to FIG. 6, a further embodiment (Embodiment 6) of the disclosure is as follows. Based on Embodiment 1, as shown in FIG. 5 and FIG. 6, the damper base 2 and the damping mechanism 3 of the damping hinge are detachably connected to each other. For the embodiment shown in FIG. 1 and FIG. 2, examples of the damper base 2 and the damping mechanism 3 on the first clamp plate 4, as well as the damper base 2 and the damping mechanism 3 on the second clamp plate 5 are shown in FIG. 5. For the embodiment shown in FIG. 3 and FIG. 4, examples of the damper base 2 and the damping mechanism 3 on the first clamp plate 4 are shown in FIG. 6. The damper base 2 and the damping mechanism 3 on the second clamp plate 5 are shown in FIG. 5.

In this regard, FIG. 5 shows the cooperative clamping of T-shaped stop blocks 13 provided on the fixed pressure block 31 in the complementary T-shaped slots 23 provided in the damper base 2. FIG. 6 shows the staggered clamping of square stop blocks 13' on the fixed pressure block 31 in the complementary L-shaped grooves 23' provided in the damper base 2. It can be seen that such mechanism for the detachable connection of the damper base 2 and the damping mechanism 3 in this application is not limited to these structures shown in the drawings. All of the technical solutions which allow the damper base 2 and the damping mechanism 3 to be detachably connected to one another should be regarded as equivalent embodiments in this application.

In addition, as shown in FIG. 2, the damping hinge in this embodiment (as with the other embodiments) further includes a rotation shaft 6 (i.e., defining the hinge axis) which connects the first clamp plate 4 to the second clamp plate 5. The rotation shaft 6 comprises a rotation pin 61, an automatic tension adjuster 62, and a torsional spring 63, wherein the automatic tension adjuster 62 is connected to the rotation pin 61 through the torsional spring 63 and is formed with an adjustment slot 64 that is externally accessible. In this embodiment, as shown in FIG. 2, the automatic tension adjuster 62 is composed of chamfered adjustment blocks 65, a spring 66, a rotation block 67, and a pawl base 68, wherein the rotation block 67 is connected to the pawl base 68 and has two sides formed with holes. The spring 66 is arranged in the holes and is in abutting connection with the chamfered adjustment blocks 65; the chamfered adjustment blocks 65 are connected to the pawl base 68 and the adjustment slot 64 is formed in the pawl base 68. The adjustment slot 64 in this application is a hexagonal socket and can rotate by means of an Allen key to make sure that the chamfered adjustment blocks 65 are always in contact with the pawl base 68 to rotate the torsional spring 63. The closing strength of the hinge can be modified by adjusting the tension of the torsional spring 63, so that the closing strength of the hinge can be modified without disassembling the spring adjuster 62. On this basis, users can adjust the closing strength of the hinge according to the most appropriate level suited to the application, thereby improving overall effect and service life of the damping hinge.

In addition, there is no limitation on the specific structure of the automatic tension adjuster 62. All of the embodiments referring to adjustment devices that are externally accessible should be regarded as equivalent embodiments in this the application.

In summary, the damping hinge proposed according to this disclosure has the first inclined surface of each movable pressure block in abutting connection with the second inclined surface on the other clamp plate, so that the movable pressure block and damper can move vertically. Spiral inclined surfaces may be adopted to ensure that each first inclined surface and the second inclined surface are in surface contact all the times when they press against each other, so that a better compression effect can be achieved and damage to both inclined surfaces can be prevented. The dampers are limited by the holding slots in the fixed pressure blocks and are guided by the slide grooves to compress and extend vertically. When the pressure rods of dampers in the damping mechanisms of the two clamp plate assemblies are connected to different pressure blocks, the hydraulic dampers in this embodiment can be arranged to have upward facing openings and to be compressed vertically, thereby effectively preventing hydraulic fluid leakage. The adjustment slot that is externally accessible allows the user convenient access, so that the closing strength of the hinge can be adjusted without disassembling the tension adjuster. This significantly improves the damping effect and service life of the dampers. At the same time, the length of the damper grooves is arranged to be shorter than that of the damping mechanisms when the dampers are not compressed in order to secure the damping mechanisms. The holding slots may be configured to fix the hydraulic dampers in place. Detachable connections make for convenient disassembly, which provides for an improved safety, stability, and user experience of the damping mechanisms.

With reference now to FIGS. 9 to 12 of the drawings, a further embodiment of a damping hinge 1 is illustrated. The damping hinge 1 of this embodiment is quite similar to the damping hinge shown in FIGS. 1 and 2. In this regard, it will be understood that the configuration and operation of each damping mechanism 3 is essentially as described for the embodiment of the damping hinge shown in FIGS. 1 and 2. One difference, however, is the fact that each damper base 2 which accommodates the damping mechanism 3 on each of the first and second clamp plates 4, 5 is not configured to be received and accommodated within a recess or cutout formed in the glass panel. Instead, each damper base 2 is received and at least partially accommodated within a respective cavity or hollow 41, 51 formed in the first and second clamp plates 4, 5. In this way, each damping mechanism 3 is arranged on each said clamp plate 4, 5 such that it is configured to be positioned outside of a plane of the glass panel; i.e., adjacent or next to an outer or facing surface of the glass panel. The operation of the hydraulic damper 33 of each damping mechanism 3, namely via a fixed pressure block 31, a moveable pressure block 32, and first and second surfaces 34, 35 in abutting connection or sliding engagement, remains essentially the same as for the damping hinge 1 of FIGS. 1 and 2. In addition, an adjustable insert component 7 is provided in this embodiment to provide for adjustable fitting to the cutout in the glass panel. This aspect of the adjustable insert component 7 will not be described here in detail, however.

Figure 13:
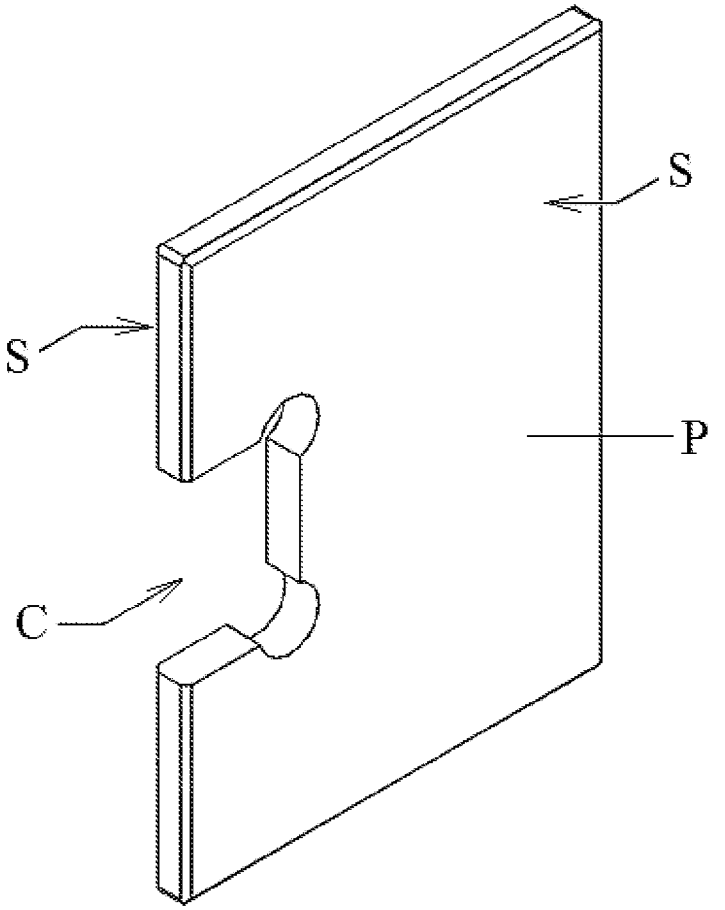
FIG. 13 is a perspective view of a glass panel having a recess or cut-out for receiving and accommodating a damping hinge of an embodiment.

With reference to FIG. 13, a glass panel P is shown with a 'mouse-ear' recess or cutout C for use with a damping hinge 1 as shown in any of FIGS. 1 to 4 or FIGS. 9 to 12 of the drawings. In the embodiment shown in drawing FIGS. 1 and 2, the damper base 2 on the first and second clamp plates 4, 5 forms an insert component that is configured to be received and fixed within such a cutout C in the glass panel P. In the embodiments shown in FIGS. 3 and 4 of the drawings, the damper base 2 provided on the second clamp plate 5 likewise forms an insert component that is configured to be received and fixed within such a cutout C of the glass panel P. In the embodiment shown in FIGS. 9 to 12, by contrast, the damper base 2 on the first and second clamp plates 4, 5 is separate from the insert component 7 that is received and fixed within the cutout C. In this case, the damper base 2 and the hydraulic dampers 33 are arranged outside the plane of the glass panel P next to or adjacent a plane of a facing surface S of that panel P. This configuration enables the damping hinge 1 of FIGS. 9 to 12 to be used without the adjustable insert component 7 on a glass door panel P that is simply drilled with circular holes instead of providing a mouse-ear shaped cutout C. The damping mechanisms 3 will be arranged then lying adjacent or next to an outer or facing surface S of the glass panel P. Of course, if the damping hinge 1 having the configuration of FIGS. 9 to 12 is used to replace a pre-existing defective or worn-out hinge on a glass door or gate having a panel P that already includes a cutout C, then—as seen in FIGS. 9 to 12—the damping hinge 1 may optionally incorporate an insert component 7 to be received and fixed within the cutout C to assist in stably securing the hinge 1 to such a panel P. In this way, the hinge 1 can be adapted to the pre-existing door or gate and it is not necessary to replace the glass panel P.

Figure 14:
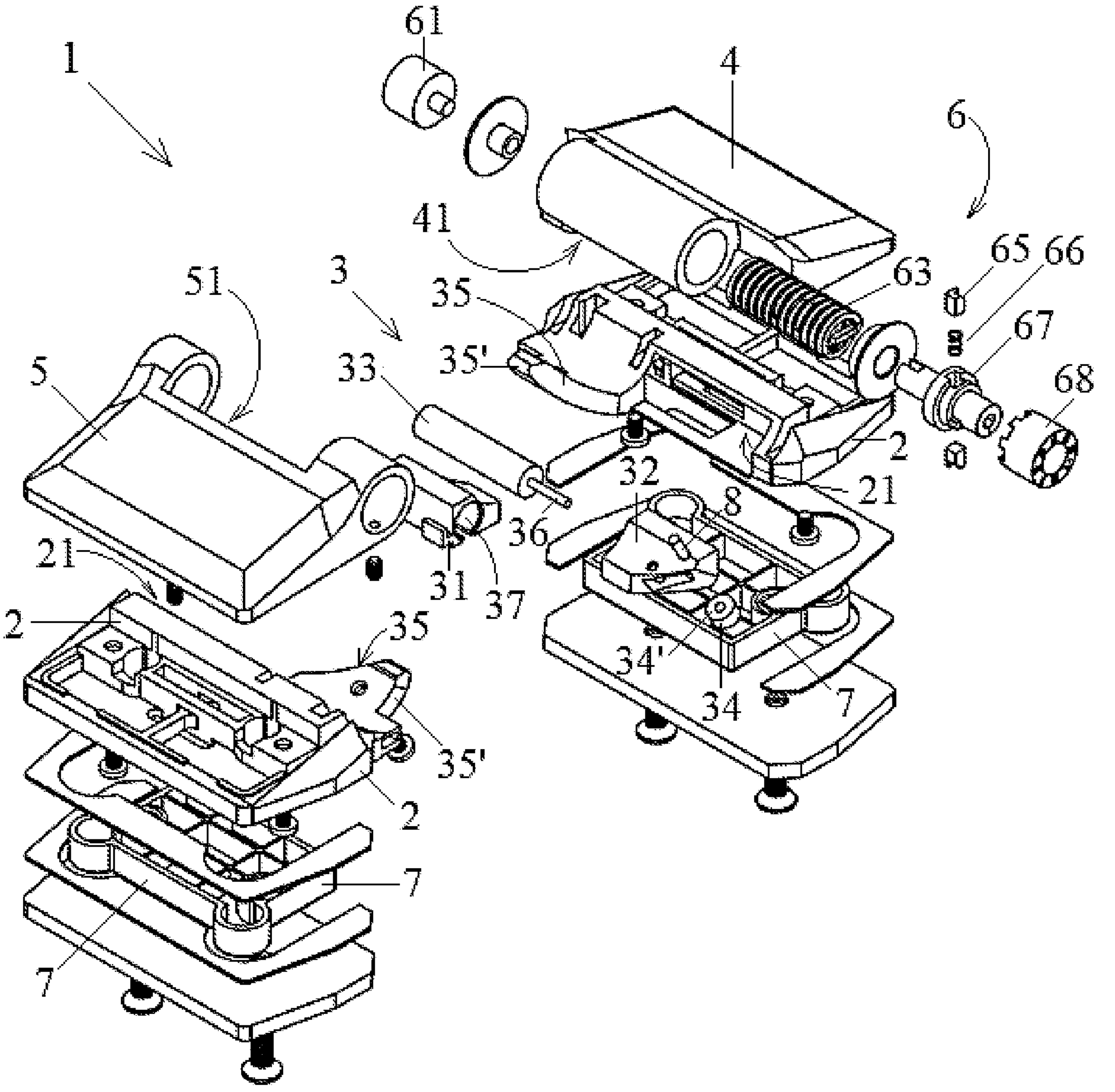
FIG. 14 is a perspective exploded or disassembled view of a damping hinge according to another embodiment.

Referring to FIGS. 14 to 17 of the drawings, yet another embodiment of a damping hinge 1 is illustrated. The damping hinge 1 of this embodiment is again very similar to the embodiments of the damping hinge shown in FIGS. 1 and 2 and in FIGS. 9 to 12 of the drawings. Indeed, like the embodiment in FIGS. 9 to 12, the damping hinge 1 in FIG. 14 is configured such that each of the damper bases 2 accommodating a respective damping mechanism 3 on each of the first and second clamp plates 4, 5 is not configured to be received and accommodated in a recess or cutout C formed in a glass panel P to which they are mounted. Instead, each damper base 2 is received and partially or substantially fully accommodated within a respective cavity or hollow 41, 51 formed in the first and second clamp plates 4, 5. In this way, each damping mechanism 3 is arranged on each said clamp plate 4, 5 such that it can be positioned outside of a plane of the glass panel; i.e., adjacent or next to an outer or facing surface S of the glass panel. In this particular example, the damping hinge 1 again incorporates an insert component 7 to be received and fixed within a cutout C for stably securing the hinge 1 to a pre-existing panel P that includes the cutout. Importantly, however, this embodiment is also designed to be used without the insert component 7 on a glass door panel P that is just provided with circular mounting holes instead of a mouse-ear shaped cutout C. The damping mechanisms 3 in the damper bases 2 will be then arranged lying next to an outer or facing surface S of each glass panel P.

Figure 15:
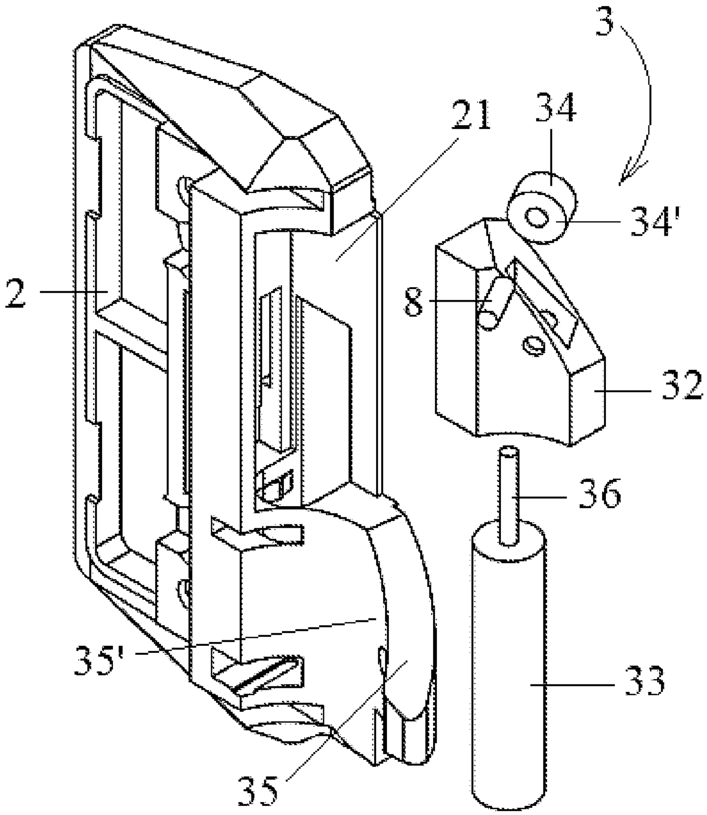
FIG. 15 is a perspective view showing the cooperation or assembly of parts of the damper base and damping mechanism in the embodiment of FIG. 14.
Figure 16:
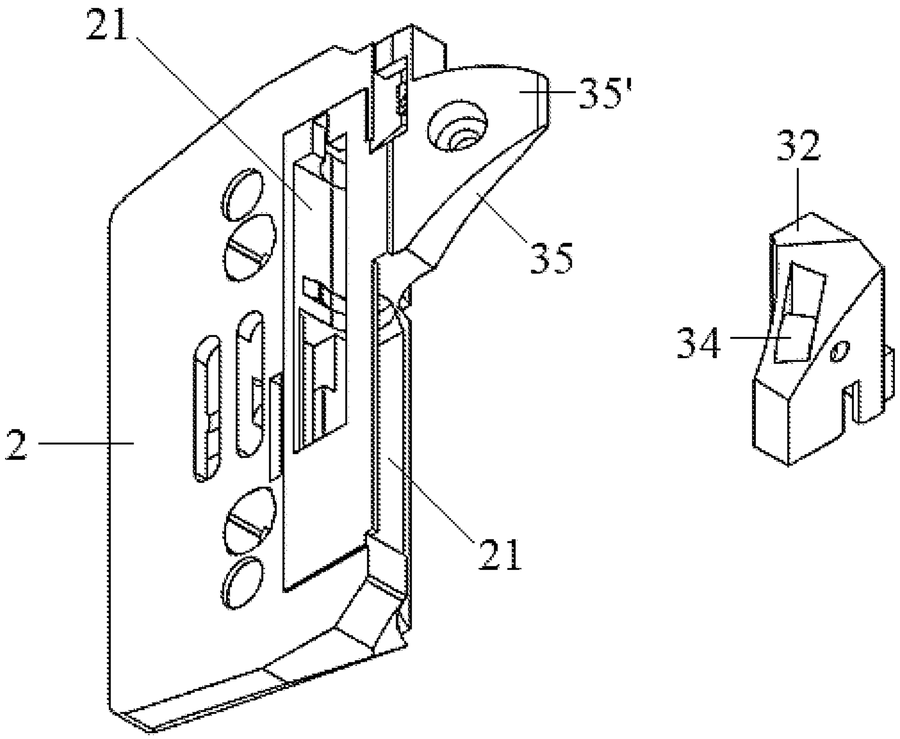
FIG. 16 is a perspective view showing parts of the damper base and damping mechanism in the embodiment of FIG. 14.
Figure 17:
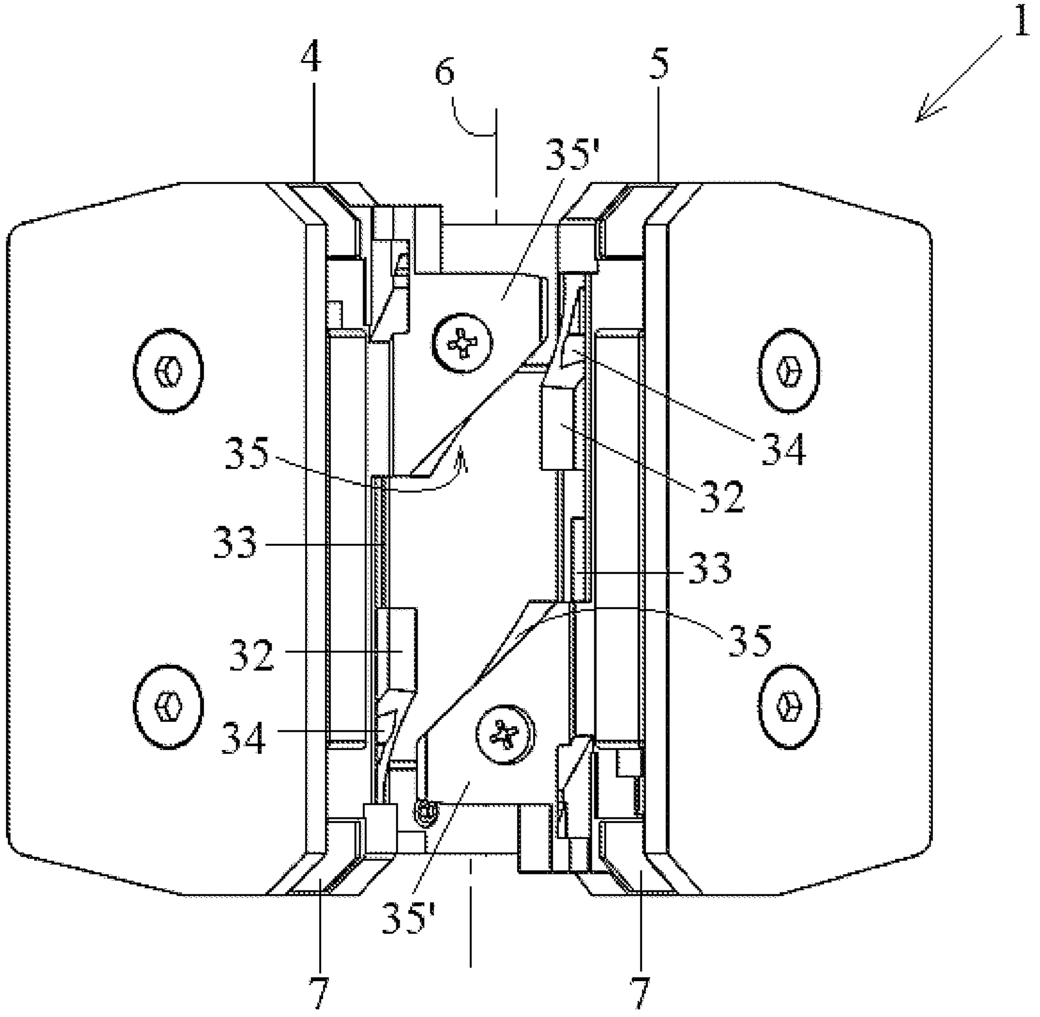
FIG. 17 is a perspective assembled view of the damping hinge in FIG. 14.

With particular reference also to FIGS. 15-17, each damping mechanism 3 in the hinge 1 of this embodiment incorporates a roller 34' rotatably mounted on a roller axle or pin 8 in the movable pressure block 32. An outer periphery or circumference of the roller 34' forms the first inclined surface 34 of the moveable pressure block 32 in the damping mechanism 3 on one of the clamp plates 4, 5 configured for rolling engagement with the second, spiral inclined surface 35 on the extension 35' from the other clamp plate 5, 4. The spirally curved surfaces 35 of the two damping mechanisms 3 in this embodiment are particularly visible in FIG. 17, which shows the second clamp plate assembly 5 rotated to an open position about the hinge axis 6. As the second clamp plate assembly 5 rotates back towards the closed position, the extension 35' of each damping mechanism 3 will engage the roller 34' in the respective moveable pressure block 32 such the that spiral inclined surfaces 35 on the extensions 35' will come into rolling engagement or contact with the outer surfaces 34 of the rollers. This will actuate movement of each moveable pressure block 32 in a vertical direction, thereby transferring force to the hydraulic piston dampers 33, which in turn will retard or brake the closing action of the hinge 1 under the self-closing bias of the torsion spring 63 as the hinge moves to the closed position. In this way, the damping hinge 1 provides the desired 'soft-close' operation.

Figure 18:
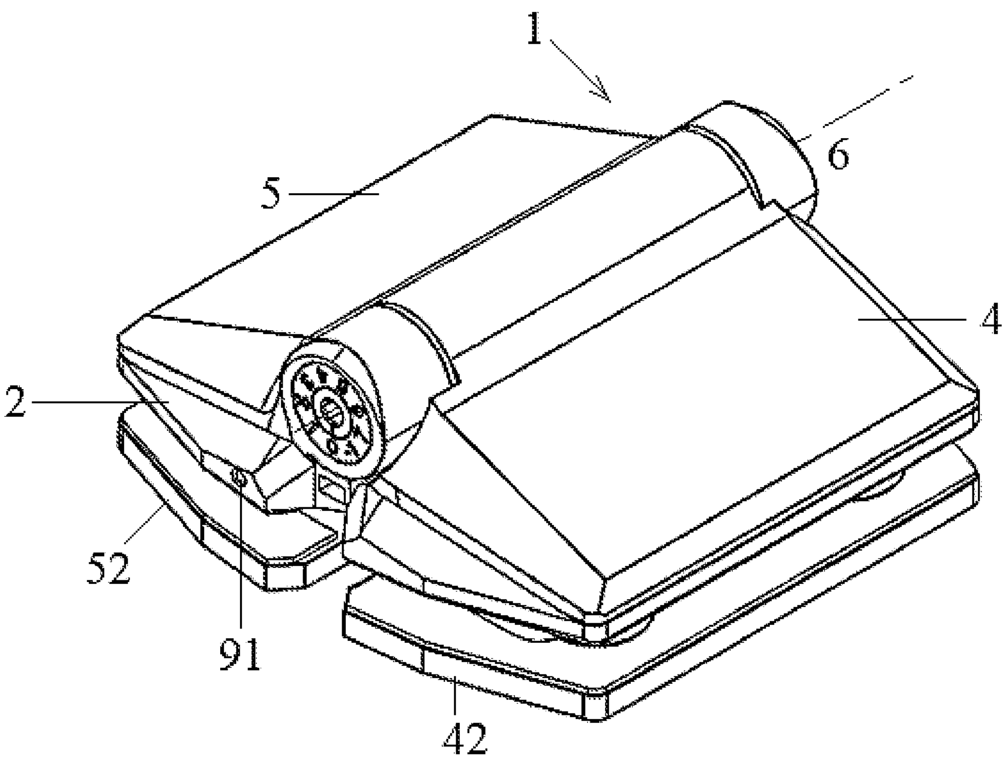
FIG. 18 is a perspective view of a damping hinge according to still another embodiment.
Figure 19:
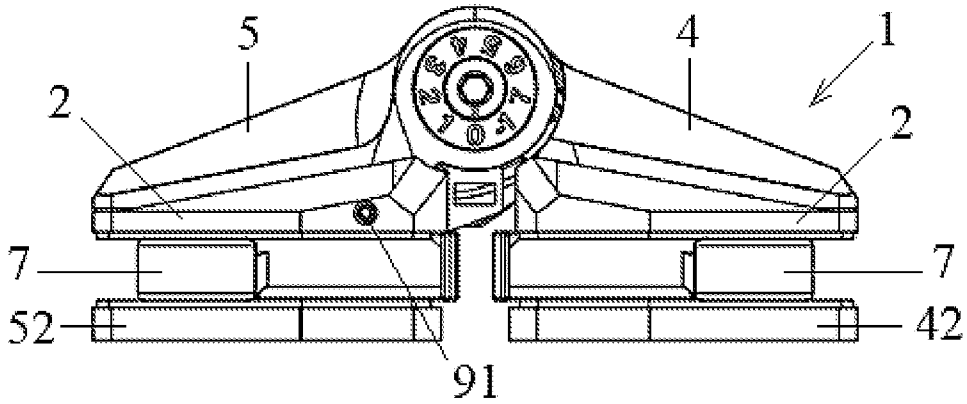
FIG. 19 is an end view of the damping hinge of the embodiment of FIG. 18.

With reference now to FIGS. 18 to 22 of the drawings, another embodiment of a damping hinge 1 is illustrated. The damping hinge 1 of this embodiment is quite similar to the hinge of FIGS. 14 to 17, with the main differences being that (i) the hinge 1 of this new embodiment includes only a single damping mechanism 3 with a piston-type damper 33 arranged in one of the two clamp plate assemblies or leaf assemblies 4, 5, and (ii) the damping mechanism 3 is itself configured somewhat differently and is adjustable. As a skilled person will appreciate, the damping hinge 1 shown in FIGS. 18 and 19 is configured as a "glass-to-glass" hinge, with which a glass panel forming a door or gate is connected to a fixed supporting glass panel. In this arrangement, the damper 33 of the damping mechanism 3 can be arranged on either of the clamp plates or leaf assemblies 4, 5, with the actuating member or actuating extension 35' then provided on and projecting from the opposite clamp plate or leaf assembly 4, 5. As will also be appreciated, the principles of this damping hinge 1, as with those described above, are equally applicable to a "glass-to-wall" type hinge with which a glass panel forming a door or gate is connected to a fixed structure, such as a wall or a post.

Figure 20:
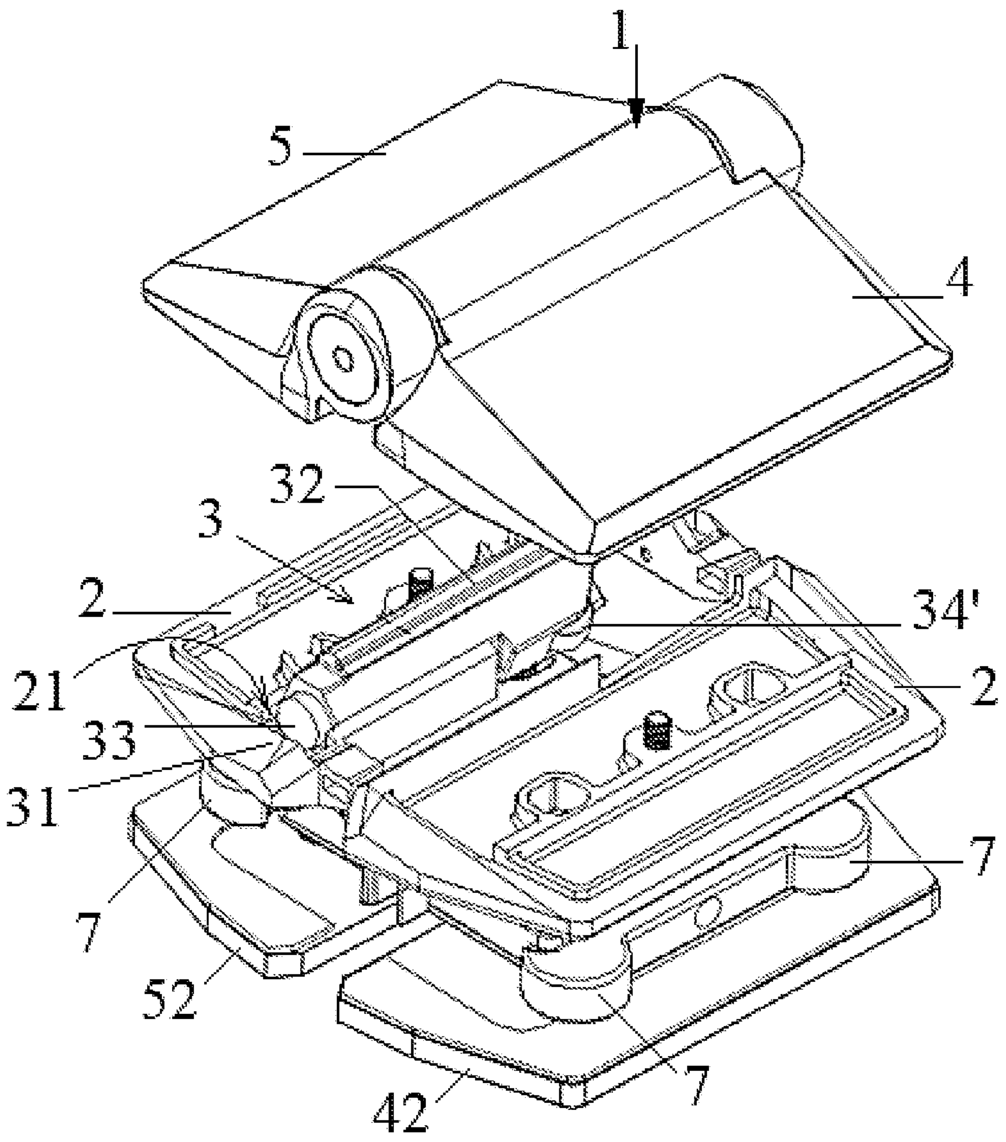
FIG. 20 is a partially exploded or disassembled view of the damping hinge in FIG. 18.
Figure 21:
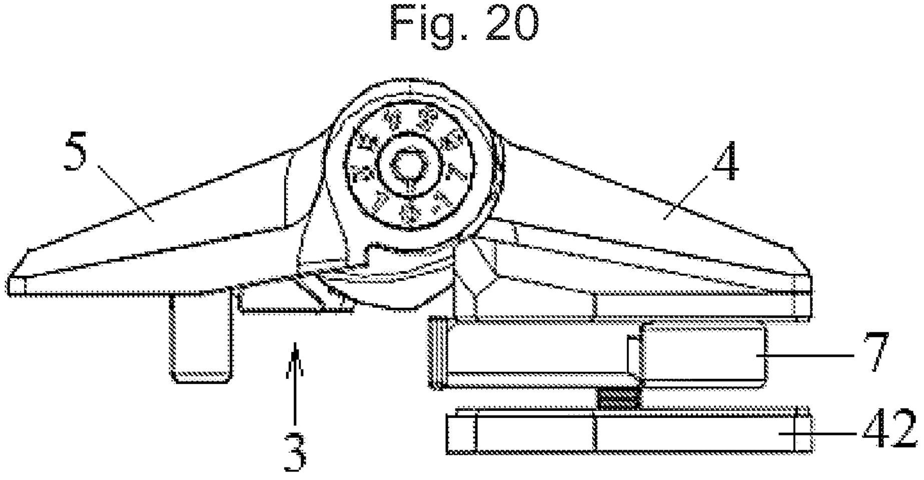
FIG. 21 is an end view of the damping hinge in FIG. 18 shown partially disassembled with one (rear) plate element and the insert component of one leaf assembly removed.

As seen in FIGS. 20 and 21, the damping hinge 1 of this embodiment is configured such that the damper base 2 accommodating the damping mechanism 3 on the second clamp plate 5 is received and substantially fully housed within a cavity or hollow 51 formed in the second clamp plate 5. In this way, the damping mechanism 3 is again arranged on the clamp plate 5 such that it can be positioned adjacent to the plane of an outer or facing surface S of the glass panel P. In this example, the damping hinge 1 again includes an insert component 7 to be received and fixed in a pre-existing cutout C in the panel P for stably securing the hinge 1 to the panel P. However, this embodiment may also be used without the insert component 7 on a glass door panel P simply having circular mounting holes instead of a mouse-ear shaped cutout C. The damping mechanism 3 in the damper base 2 will be then arranged next to an outer or facing surface S of the glass panel P.

Figure 22:
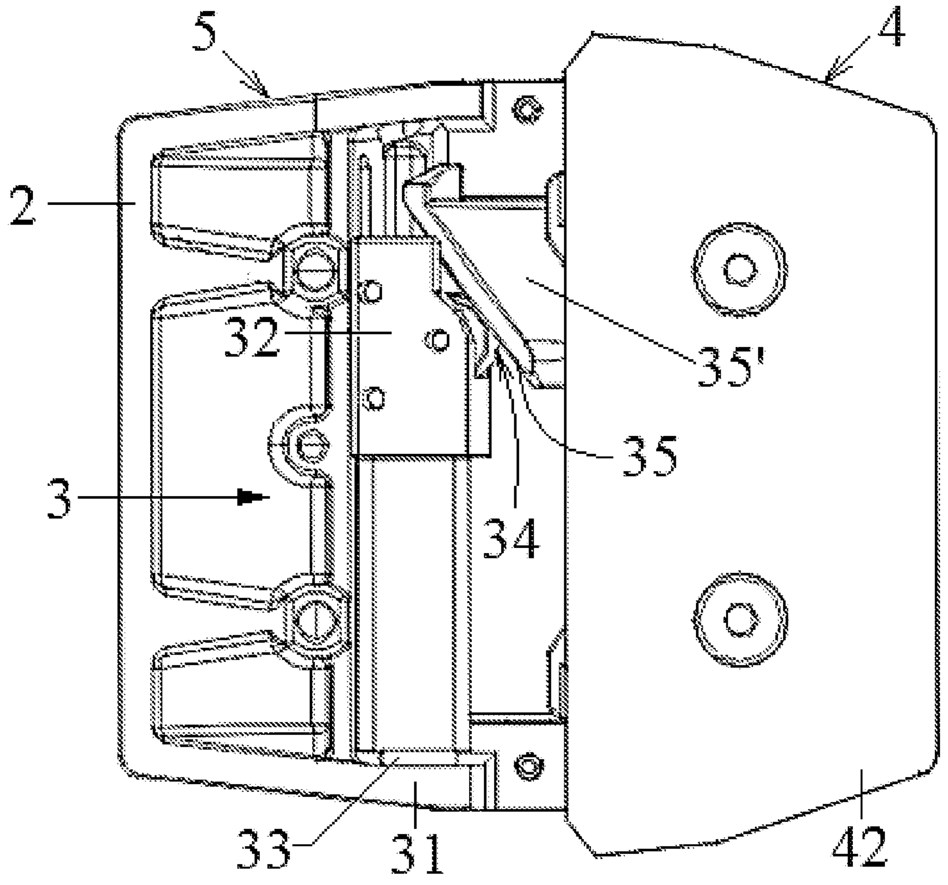
FIG. 22 is a rear view of the partially disassembled damping hinge shown in FIG. 21.
Figure 23:
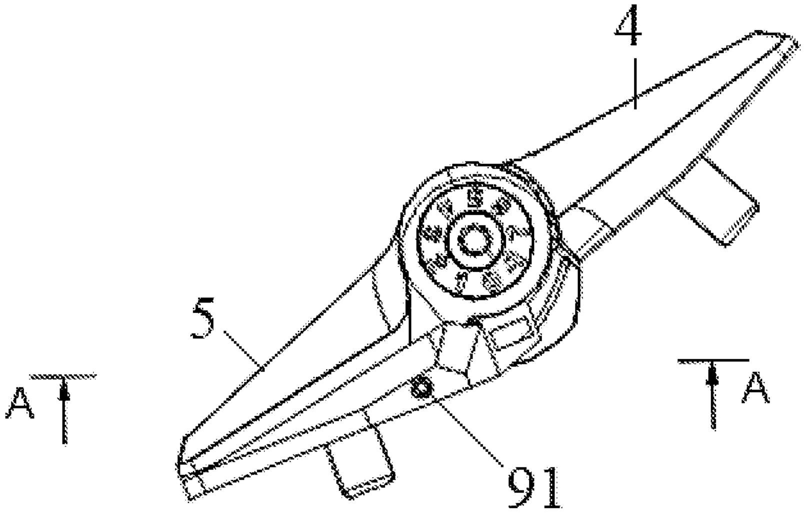
FIG. 23 is an end view of the damping hinge in FIG. 18 shown partially disassembled with both (rear) plate elements and both insert components of the two leaf assemblies removed.
Figure 24:
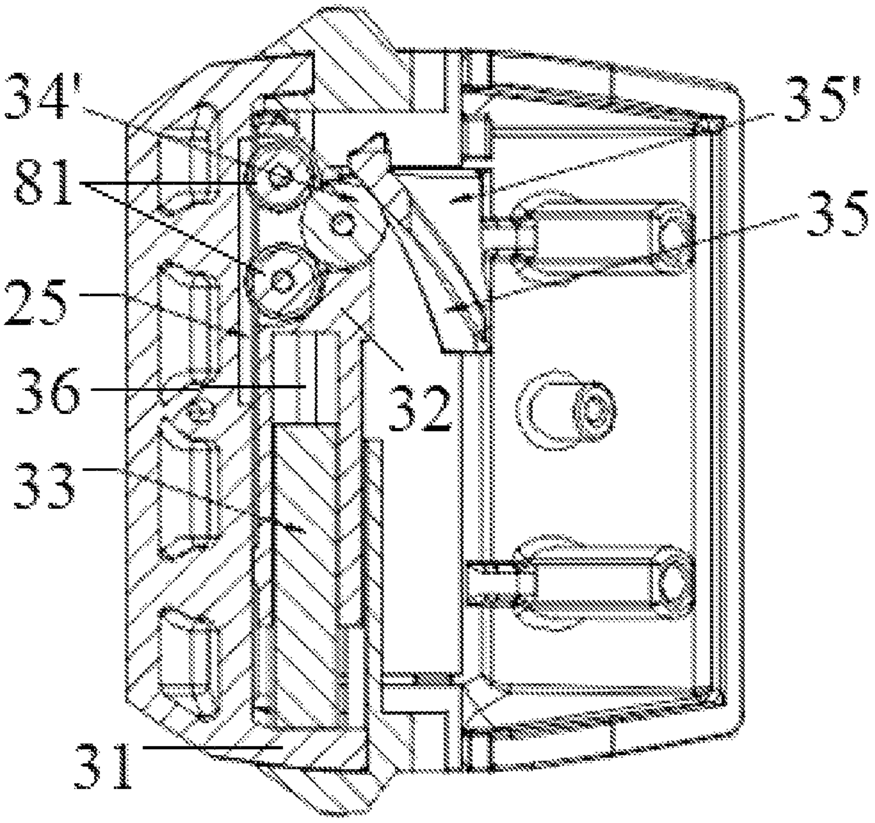
FIG. 24 is a partial cross-sectional view taken in the direction of the arrows A-A in FIG. 23.
Figure 25A:
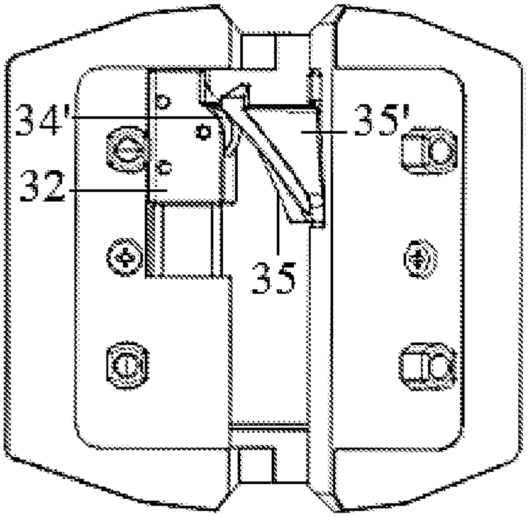
FIG. 25A is a rear view of the hinge shown in FIG. 23 with the damping mechanism in initial engagement with the actuator as the hinge moves to the closed position.
Figure 25B:
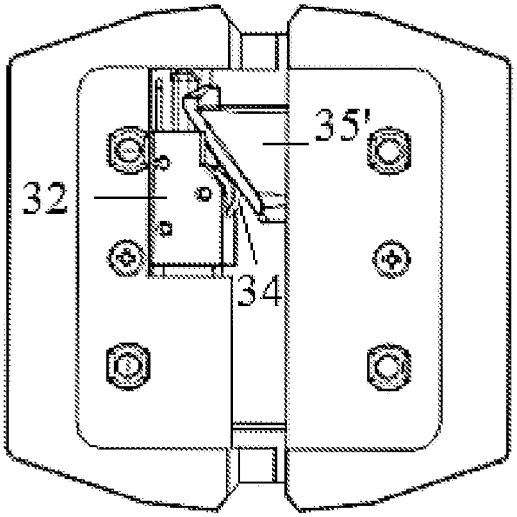
FIG. 25B is a rear view of the hinge shown in FIG. 23 with the damping mechanism in fully compressed state as the hinge has reached the closed position.
Figure 26:
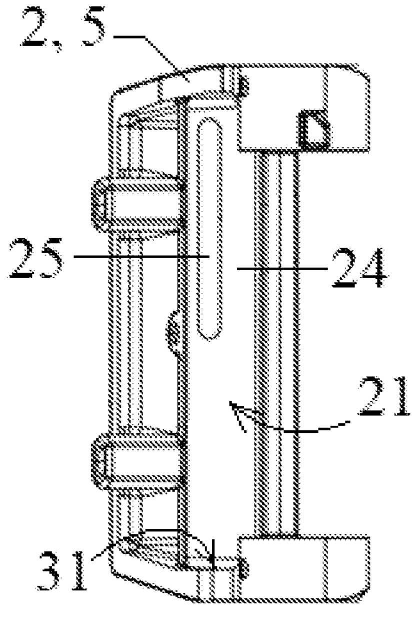
FIG. 26 is an inner side view of one clamp plate or leaf assembly of the hinge shown in FIG. 23 for accommodating or housing the damping mechanism.
Figure 27:
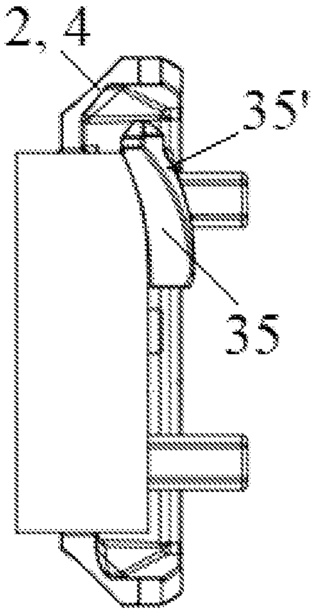
FIG. 27 is an inner side view of the other clamp plate or leaf assembly of the hinge shown in FIG. 23 having the actuating member with an inclined actuating surface.
Figure 28:
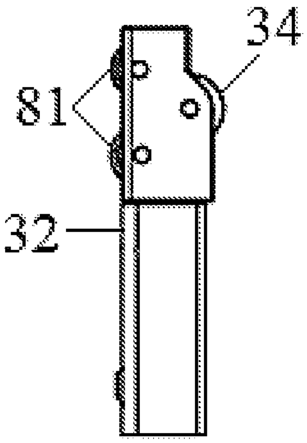
FIG. 28 is a front view of the movable pressure block of the hinge in FIGS. 18-24.
Figure 29:
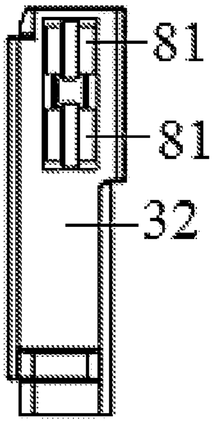
FIG. 29 is a side view of the movable pressure block of the hinge in FIGS. 18-24.
Figure 30:
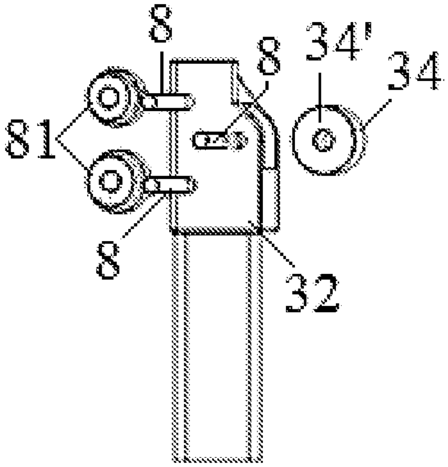
FIG. 30 is a perspective, partially exploded view of the movable pressure block of the hinge in FIGS. 18-24.

Referring to FIGS. 22 to 24, the damping mechanism 3 of this embodiment has a roller 34' rotatably mounted on a roller axle or pin 8 in the movable pressure block 32, which—as in the embodiment of FIGS. 14 to 17—is arranged on one end of the hydraulic damper 33 (e.g., on the pressure rod 36) and arranged in a cavity or groove 21 for guided vertical movement. In this embodiment, the roller 34' again forms a cam follower for rolling contact with an actuating extension 35' from the other clamp plate assembly 4. Specifically, an outer periphery or circumference of the roller 34' forms a first inclined surface 34 of the moveable pressure block 32 in the damping mechanism 3 for rolling engagement with a second, spiral inclined surface 35 on the actuating extension 35' from the other clamp plate assembly 4. The curved surface 35 of the actuating extension 35' in this embodiment is clearly visible in FIG. 24 which shows the first clamp plate assembly 4 rotating from an open position back towards the closed position. The actuating extension 35' of damping mechanism 3 engages the roller 34' in the moveable pressure block 32 so that the spiral inclined surface 35 comes into rolling engagement or contact with the outer surface 34' of the roller. This actuates movement of moveable pressure block 32 in a vertical direction, thereby transferring force to the hydraulic piston damper 33, which then retards or brakes the closing action of the hinge 1 under the self-closing bias of a torsion spring 63 as the hinge moves to the closed position. In this way, the damping hinge 1 provides the desired 'soft-close' operation. Because the roller axle 8 that supports the contact roller 34' in the embodiment of FIGS. 14 to 17 may over time and with extended use of the hinge 1 suffer from wear and bending deformation, the moveable pressure block 32 of this embodiment has been configured differently, as described below.

With reference to FIGS. 22 to 32, it will be appreciated that the moveable pressure block 32 of the damping mechanism 3 not only includes a follower roller 34' for contacting and following the spiral inclined surface 35 of the actuating extension 35', but one or more (desirably two) guide rollers 81 arranged in rolling engagement with the follower roller 34'. The guide rollers 81 are each likewise rotatably mounted on a respective axle or pin 8 in the moveable pressure block 32 and are positioned such that they are in rolling contact or engagement with a facing wall or surface 24 of the cavity or groove 21 within which the damping mechanism 3 is accommodated. The guide rollers 81 thus provide for a rolling movement of the moveable pressure block 32 in the cavity or groove 21 as the damper 33 is compressed and expands, instead of the previous sliding movement, which thereby reduces friction in the damping mechanism 3. Furthermore, however, it will be seen that the guide rollers 81 are also mounted or positioned in rolling contact or engagement with the follower roller 34'. Accordingly, a laterally directed force or load upon the follower roller 34' resulting from its engagement with the actuating member 35' is borne directly by the adjacent guide roller(s) 81, which in turn transmit that force or load to the wall 24 of the damper base 2. As a result, the roller axles or pins 8 of the rollers 34', 81 are substantially isolated from the force or load exerted by the actuating member 35'.

Figure 31A:
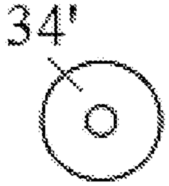
FIGS. 31A-31B are a (FIG. 31A) front view and (FIG. 31B) side view of a contact roller or cam follower for engaging the inclined surface of the actuating member.
Figure 31B:
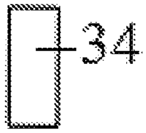
Figure 32A:
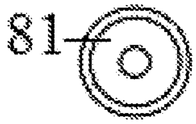
FIGS. 32A-32B are a (FIG. 32A) front view and (FIG. 32B) side view of a guide roller for engaging the contact roller or cam follower and supporting vertical movement of the damping mechanism.
Figure 32B:
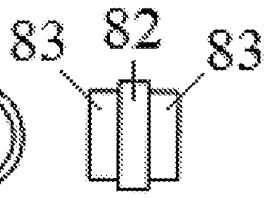
Figure 33:
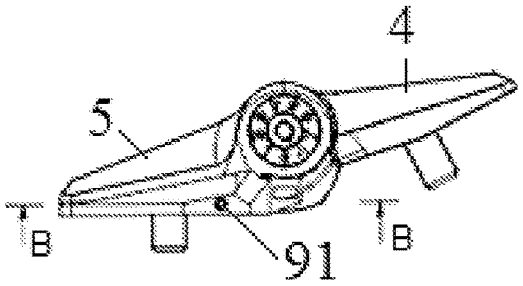
FIG. 33 is an end view of the damping hinge in FIG. 18 shown partially disassembled with both (rear) plate elements and both insert components of the two leaf assemblies removed.

It will also be noted that the wall or surface 24 of the cavity or groove 21 against which the guide rollers 81 bear and roll includes a vertically extending channel or slot 25. Although, as seen in FIGS. 31A-31B, the follower roller 34' has a plain cylindrical outer profile, it is apparent from FIGS.

32A-32B that each guide roller 81 has a stepped outer profile comprising a central portion 82 of larger diameter and two laterally opposite portions 83 of a smaller diameter. The width of the vertically extending channel or slot 25 in the wall 24 is sized to receive the central portion 82 of each guide roller 81 in such a way that it is the smaller diameter lateral portions 83 that make rolling engagement with the wall 24. By virtue of the fact that the larger diameter central portion 82 of each guide roller 81 engages the follower roller 34' and the smaller diameter lateral portions 83 then engage the wall 24, the smaller diameter of the guide rollers 81 against the wall 24 creates a rolling differential which effectively transposes the linear distance traversed by the follower roller 34' along the inclined surface 35 of the actuating extension 35' into a shorter vertical rolled distance corresponding to the effective stroke length of the hydraulic damper piston 33. When the guide rollers 81 are in contact with follower roller 34', this configuration of the guide rollers 81 allows them to maintain rolling contact with the wall 24 over the full length of the vertical movement (i.e., stroke) transmitted to moveable pressure block 32 and to the hydraulic damper 33. As will be appreciated by persons skilled in the art, a corresponding functional benefit could also be obtained by a reversed stepped profile in each guide roller 81, namely with a central portion formed as an annular recess in the circumferential periphery of the roller which is configured to receive and to make rolling engagement with a vertically extending rail member (not shown) upstanding from the wall 24 in place of the channel or slot 25. As will also be appreciated, if the guide rollers 81 do not make contact with the follower roller 34', then a stepped profile and a rolling differential created by the guide rollers 81 is no longer a relevant design consideration. In that case, however, the axles or pins 8 of the rollers 34', 81 will be subjected to higher loads.

Figure 34:
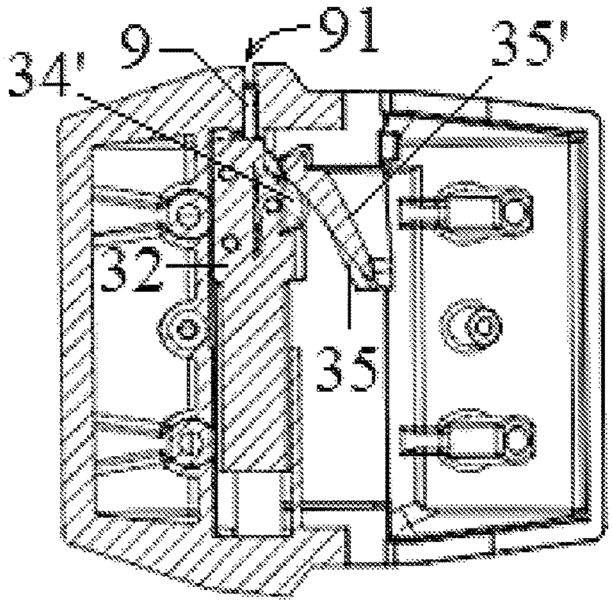
FIG. 34 is a partial cross-sectional view taken in the direction of the arrows B-B in Fig. 33.
Figure 35A:
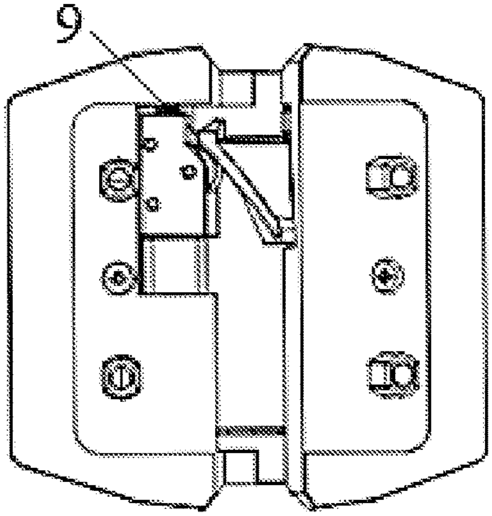
FIGS. 35A-35B are a (FIG. 35A) end view and (FIG. 35B) rear view of the hinge shown in FIGS. 35A-35B with the damping mechanism adjustment screw partially driven in and the damping mechanism in initial engagement with the actuating member as the hinge moves to the closed position.
Figure 36A:
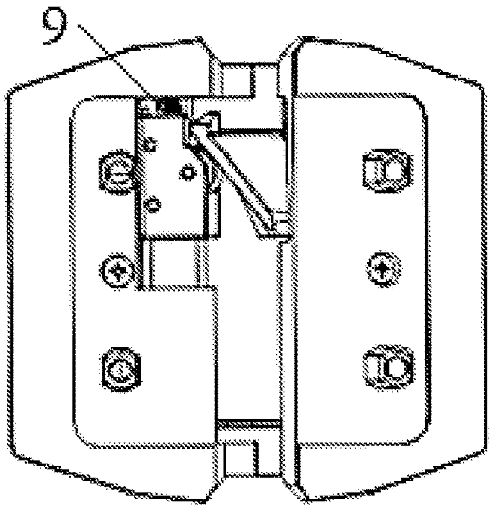
FIGS. 36A-36B are a (FIG. 36A) end view and (FIG. 36B) rear view of the hinge shown in FIGS. 35A-35B with the damping mechanism adjustment screw fully driven in and the damping mechanism in initial engagement with the actuating member as the hinge moves to the closed position.
Figure 35B:
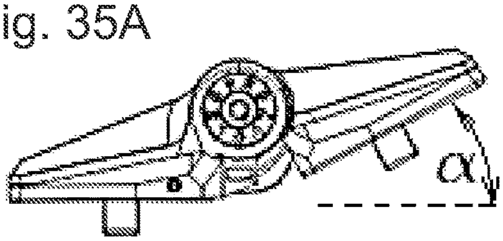
Figure 36B:
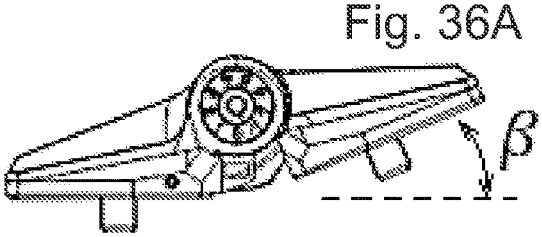

With reference now to drawing FIGS. 33 to 36, operation of an adjustment device for the damping mechanism 3 will be explained. The clamp plate 5 housing the damping mechanism 3 includes an adjustment screw 9 (e.g., a grub screw) movable in a threaded hole 91 in direct alignment with the damping mechanism 3. Using a suitable tool (e.g., a screwdriver) inserted into the hole 91, the screw 9 can be driven deeper into the hole 91 such that it emerges from the opposite end of the hole 91 to engage and compress the damping mechanism 3. As seen in FIG. 34, the base of the screw engages the end of the movable pressure block 32, which in turn compresses the hydraulic damper 33. In this way, the maximum expansion of the hydraulic damper 33 can be reduced, as can be seen by comparing FIGS. 35 and 36. When the final (max.) return position of the damper 33 is retracted or compressed, the effective stroke of the hydraulic damper 33 becomes shorter and the angular extent over which the inclined surface 35 of the actuating extension 35' makes contact with the surface 34 of the follower roller 34' before the hinge reaches the closed position becomes smaller. As a consequence, the damping effect occurs over a shorter angular range, as is apparent from a comparison of the angle $\alpha$ in FIG. 35B and the smaller angle $\beta$ in FIG. 36B, over which respective angles the damping effect occurs. The result is that the closing door or gate travels a greater angular distance towards the closed position under the self-closing bias of the torsion spring 63 before the braking or retarding effect of the damping mechanism 3 commences, and that braking or retarding effect of the damping mechanism 3 also occurs for a shorter angular distance. In this way, the damping adjustment screw 9 provides a device for adjusting the degree or extent of the damping effect and, consequentially, also the closing time for the damped self-closing of the door or gate.

Although specific embodiments of the disclosure are illustrated and described herein, it will be appreciated by those of ordinary skill in the art that a variety of alternative and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the present disclosure and any legal equivalents. Generally, this application is intended to cover any adaptations or variations of the specific embodiments discussed herein.

It will also be appreciated that in this document, as the context requires, the terms “comprise”, “comprising”, “include”, “including”, “contain”, “containing”, “have”, “having”, and variations thereof, are intended to be understood in an inclusive (i.e. non-exclusive) sense, such that the system, method, process, device or apparatus described herein is not limited to the features or parts or elements or steps recited but may include other features, parts, elements or steps not expressly listed or inherent to such system, method, process, device or apparatus. Furthermore, the terms “a” and “an” used herein are intended to be understood as meaning one or more unless explicitly stated otherwise. Moreover, the terms “first”, “second”, “third”, etc. as used herein, for example, in respect of particular embodiments or in respect of the two clamp plates or in respect of the two surfaces in abutting connection, are used herein merely as identifying labels and are not intended to impose any numerical requirements on, or to establish a certain ranking of importance of, their objects.

| Description Of Reference Labels |
| --- |
| 1 = hinge body |
| 2 = damper base |
| 21 = damper groove |
| 22 = slide notch |
| 23 = slot or groove on damper base |
| 23' = slot or groove on damper base |
| 24 = wall or surface of damper groove |
| 25 = guide channel in wall |
| 3 = damping mechanism |
| 31 = fixed pressure member or block |
| 32 = movable pressure member or block |
| 33 = damper |
| 34 = first inclined surface |
| 34' = roller |
| 35 = second inclined surface |
| 35' = extension or actuating member |
| 36 = pressure rod |
| 37 = holding slot |
| 38 = slide groove |
| 39 = slide rod |
| 13 = stop block on fixed pressure block |
| 13' = stop block on fixed pressure block |
| 4 = first clamp plate |
| 41 = cavity or hollow in first clamp plate |
| 42 = first rear plate element |
| 5 = second clamp plate |
| 51 = cavity or hollow in second clamp plate |
| 52 = second rear plate element |
| 6 = rotation shaft |

-continued

| Description Of Reference Labels |
| --- |
| 61 = rotation pin |
| 62 = automatic tension adjuster |
| 63 = torsion spring |
| 64 = adjustment slot |
| 65 = adjustment block |
| 66 = spring |
| 67 = rotation block |
| 68 = pawl base |
| 7 = adjustable insert component |
| 8 = roller axle or pin |
| 81 = guide roller |
| 82 = central portion |
| 83 = lateral portion |
| 9 = damping adjustment screw |
| 91 = hole |
| P = glass panel |
| C = cutout or recess in glass panel |
| S = facing surface of glass panel |

The invention claimed is:

1. A damping hinge for controlled closing of a door or gate, comprising:

a first clamp plate configured to be mounted to a fixed supporting panel;

a second clamp plate configured to be mounted to a panel of the door or gate, wherein the second clamp plate is connected with the first clamp plate for relative rotation thereto about a hinge axis; and a damping mechanism arranged on at least one of the first clamp plate and the second clamp plate, the damping mechanism including a linear damper arranged substantially parallel to the hinge axis and configured to retard or control relative rotation of the second clamp plate towards the first clamp plate during closing of the hinge;

wherein one end of the linear damper is operatively fixed and an opposite end of the linear damper is provided with a movable pressure member constrained to move in the damping mechanism in a direction parallel to the hinge axis, and wherein the movable pressure member of the damping mechanism on said first or second clamp plate has a surface which engages with a surface of an actuating member that extends from the other clamp plate to effect movement of the movable pressure member in the direction parallel to the hinge axis upon relative rotation of the second clamp plate towards the first clamp plate to transmit a force to the linear damper during closing of the door or gate.

2. The damping hinge according to claim 1, wherein the damping mechanism is arranged on the first clamp plate or the second clamp plate such that the damping mechanism will be located outside of a plane of the respective panel and adjacent or next to an outer or facing surface of that panel.

3. The damping hinge according to claim 1, further comprising a damper base provided on the said clamp plate on which the damping mechanism is arranged, wherein the damping mechanism is arranged on the damper base.

4. The damping hinge according to claim 3, wherein the damper base is arranged in a hollow or cavity formed in said clamp plate such that the damping mechanism is positioned adjacent or next to an outer or facing surface of the respective panel.

5. The damping hinge according to claim 1, wherein the actuating member and the movable pressure member are configured for rolling engagement with one another, the rolling engagement causing movement of the movable pressure member vertically upon relative rotation of the second clamp plate towards the first clamp plate about the hinge axis to transmit force to the damper which, in turn, retards or controls closing of the hinge.

6. The damping hinge according to claim 5, wherein the movable pressure member has a follower roller configured for rolling engagement with the actuating member, an outer surface of the follower roller being configured for rolling engagement with a surface of the actuating member in the manner of a cam follower, and wherein the surface of the actuating member is an inclined surface.

7. The damping hinge according to claim 6, wherein the movable pressure member has at least one guide roller in rolling engagement with a wall or a surface of the clamp plate, on which the linear damper is arranged, for rolling movement in a vertical direction to transmit the force to the linear damper.

8. The damping hinge according to claim 7, wherein the at least one guide roller is in rolling engagement with the follower roller, the at least one guide roller having a larger diameter portion in rolling engagement with the follower roller and a smaller diameter portion in rolling engagement with the wall or surface of the clamp plate, on which the linear damper is arranged, for rolling movement in the vertical direction.

9. The damping hinge according to claim 1, wherein a damping mechanism is arranged on each of the first clamp plate and the second clamp plate, and wherein each damping mechanism includes a linear damper arranged substantially parallel to the hinge axis and configured to retard or control relative rotation of the second clamp plate towards the first clamp plate during closing of the hinge.

10. A damping hinge for controlled closing of a glass door or gate, comprising:

a first clamp plate configured to be mounted to a supporting structure;

a second clamp plate configured to be mounted to a panel of the door or gate, wherein the second clamp plate is connected with the first clamp plate for relative rotation thereto about a vertical hinge axis;

a damping mechanism arranged on either or each of the first clamp plate and the second clamp plate and having a linear damper that extends substantially parallel to the hinge axis, wherein one end of the damper is operatively fixed and an opposite end of the damper is operatively connected to a movable pressure member that is movable vertically to transmit force to the damper; and an actuating member that extends towards the clamp plate on which the damping mechanism is arranged from the other clamp plate to operatively engage with the movable pressure member;

wherein the actuating member and the movable pressure member are configured for rolling engagement, the rolling engagement between the actuating member and the movable pressure member causing movement of the movable pressure member vertically upon relative rotation of the second clamp plate towards the first clamp plate about the hinge axis to transmit force to the damper which, in turn, retards or controls closing of the hinge.

11. The damping hinge according to claim 10, wherein the movable pressure member has a roller for rolling engagement with the actuating member, and wherein an outer surface of the roller is configured for rolling engagement with a surface of the actuating member in the manner of a cam follower.

12. The damping hinge according to claim 11, wherein the surface of the actuating member is an inclined surface.

13. The damping hinge according to claim 10, wherein the damping mechanism is arranged such that the linear damper is positioned outside of a plane of the panel adjacent or next to an outer or facing surface of the panel.

14. The damping hinge according to claim 10, wherein a damping mechanism is arranged on each of the first clamp plate and second clamp plate, wherein each damping mechanism includes a linear damper which is arranged vertically.

15. A damping hinge for controlled closing of a door or gate, comprising:

a first clamp plate configured to be mounted to a fixed supporting panel;

a second clamp plate configured to be mounted to a panel of the door or gate, wherein the second clamp plate is connected with the first clamp plate for relative rotation thereto about a hinge axis; and a damping mechanism arranged on at least one of the first clamp plate and the second clamp plate including a damper arranged substantially parallel to the hinge axis and configured to retard or control relative rotation of the second clamp plate towards the first clamp plate during closing of the hinge;

wherein a movable pressure member provided at one end of the damper is movable in a vertical direction to transmit a force to the damper during closing of the door or gate, and wherein the movable pressure member includes a follower roller configured to engage with a surface of an actuating member extending from the other clamp plate to effect the vertical movement of the movable pressure member upon relative rotation of the second clamp plate towards the first clamp plate.

16. The damping hinge according to claim 15, wherein the movable pressure member is configured for rolling movement in the clamp plate, on which the linear damper is arranged, in the vertical direction to transmit the force to the damper.

17. The damping hinge according to claim 15, wherein the movable pressure member includes at least one guide roller in rolling engagement with a wall or a surface of the clamp plate, on which the linear damper is arranged, for rolling movement in the vertical direction to transmit the force to the damper.

18. The damping hinge according to claim 17, wherein the at least one guide roller is in rolling contact or rolling engagement with the follower roller.

19. The damping hinge according to claim 17, wherein the at least one guide roller has a larger diameter portion in rolling engagement with the follower roller and a smaller diameter portion in rolling engagement with the wall or surface of the clamp plate, on which the linear damper is arranged, for rolling movement in the vertical direction.

20. The damping hinge according to claim 15, further comprising a damping adjustment device having an element, such as an adjustment screw, for setting an effective stroke or a working stroke of the damper.

* * * * *